United States Patent
Xue et al.

(10) Patent No.: US 11,451,347 B2
(45) Date of Patent: Sep. 20, 2022

(54) COMMUNICATION METHOD, APPARATUS, AND SYSTEM

(71) Applicant: HUAWEI TECHNOLOGIES CO., LTD., Guangdong (CN)

(72) Inventors: Lixia Xue, Beijing (CN); Hao Sun, Xi'an (CN); Fan Yang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 182 days.

(21) Appl. No.: 17/018,361

(22) Filed: Sep. 11, 2020

(65) Prior Publication Data

US 2020/0412497 A1 Dec. 31, 2020

Related U.S. Application Data

(63) Continuation of application No. PCT/CN2019/079688, filed on Mar. 26, 2019.

(30) Foreign Application Priority Data

Apr. 4, 2018 (CN) .......................... 201810300054.8

(51) Int. Cl.
*H04L 1/18* (2006.01)
*H04W 72/04* (2009.01)

(52) U.S. Cl.
CPC ....... *H04L 1/1893* (2013.01); *H04W 72/0413* (2013.01); *H04W 72/0446* (2013.01)

(58) Field of Classification Search
CPC ....... H04L 1/1893; H04L 1/1854; H04L 5/00; H04L 1/18; H04L 1/16; H04W 72/0413; H04W 72/12; H04W 72/0446
See application file for complete search history.

(56) References Cited

U.S. PATENT DOCUMENTS

| | | | |
|---|---|---|---|
| 11,323,988 B2* | 5/2022 | Jung ................. | H04W 72/1284 |
| 2014/0247816 A1 | 9/2014 | Kim et al. | |
| 2017/0048846 A1 | 2/2017 | Yang et al. | |
| 2021/0368495 A1* | 11/2021 | Matsumura ........... | H04L 5/0094 |
| 2021/0368528 A1* | 11/2021 | Yoshimura ............ | H04L 1/1861 |

(Continued)

FOREIGN PATENT DOCUMENTS

| CN | 102316535 A | 1/2012 |
|---|---|---|
| CN | 105898870 A | 8/2016 |

(Continued)

OTHER PUBLICATIONS

Vivo, Remaining issues on PUCCH with short-duration. 3GPP TSG RAN WG1 Meeting #92, Athens, Greece, Feb. 26-Mar. 2, 2018, R1-1801535, 7 pages.

(Continued)

*Primary Examiner* — Brian D Nguyen
(74) *Attorney, Agent, or Firm* — Womble Bond Dickinson (US) LLP

(57) ABSTRACT

According to one embodiment, a terminal device receives downlink control information that is sent by a network device and that indicates a first physical downlink control channel (PUCCH), where the first PUCCH and a second PUCCH occupy a same first time-domain symbol, and the first PUCCH and a third PUCCH occupy a same second time-domain symbol; and the terminal device sends the first PUCCH, where the first PUCCH carries a first sequence and a second sequence, a cyclic shift of the first sequence is determined based on a hybrid automatic repeat request-acknowledgment (HARQ-ACK) value and state information of a scheduling request (SR) corresponding to the second PUCCH, and a cyclic shift of the second sequence is determined based on the HARQ-ACK value and state information of an SR corresponding to the third PUCCH. An HARQ-ACK and a plurality of SRs can be multiplexed on a same PUCCH improving communication efficiency.

20 Claims, 4 Drawing Sheets

(56) References Cited

U.S. PATENT DOCUMENTS

2021/0377991 A1* 12/2021 Takeda .................. H04L 1/001
2022/0141855 A1* 5/2022 Lee .................... H04W 72/042
                                                              370/330

FOREIGN PATENT DOCUMENTS

| CN | 107113150 A | 8/2017 |
| --- | --- | --- |
| CN | 107534537 A | 1/2018 |
| CN | 107787047 A | 3/2018 |
| EP | 3389208 A1 | 10/2018 |
| WO | 2011019795 A1 | 2/2011 |
| WO | 2016048595 A1 | 3/2016 |
| WO | 2017099521 A1 | 6/2017 |

OTHER PUBLICATIONS

Catt, Multiplexing of UCI transmissions of different durations or configurations. 3GPP TSG RAN WG1 Meeting #92, Athens, Greece, Feb. 26-Mar. 2, 2018, R1-1801731, 9 pages.
3GPP TSG RAN WG1 Meeting#91,R1-1721380: Review Summary for AI 7.3.2.2. PUCCH structure in long-duration Huawei, HiSilicon Reno, USA, Nov. 27-Dec. 1, 2017 total 16 pages.
3GPP TS 38.211 V15.0.0:"3rd Generation Partnership Project;Technical Specification Group Radio Access Network; NR;Physical channels and modulation(Release 15)", Dec. 2017,total 73 pages.
3GPP TS 38.213 V15.0.0 (Dec. 2017), 3rd Generation Partnership Project; Technical Specification Group Radio Access Network; NR; Physical layer procedures for control(Release 15), 56 pages.

* cited by examiner

COMMUNICATION METHOD, APPARATUS, AND SYSTEM

CROSS-REFERENCE TO RELATED APPLICATIONS

This application is a continuation of International Application No. PCT/CN2019/079688, filed on Mar. 26, 2019, which claims priority to Chinese Patent Application No. 201810300054.8, filed on Apr. 4, 2018. The disclosures of the aforementioned applications are hereby incorporated by reference in their entireties.

TECHNICAL FIELD

The present invention relates to the field of wireless communications, and in particular, to a communication method, an apparatus, and a system in a wireless communications system.

BACKGROUND

In a new radio (NR) system or in a 5th generation (5G) wireless access system, to support technologies such as dynamic scheduling and a hybrid automatic repeat request (HARQ), a terminal device feeds back uplink control information (UCI) to a network device through a physical uplink control channel (PUCCH). The uplink control information may include at least one of a hybrid automatic repeat request-acknowledgment (HARQ-ACK), a scheduling request (SR), and channel state information (CSI), where the CSI includes at least one of channel quality information (CQI), a rank indication (RI), and a precoding matrix indication (PMI). The network device configures, for the terminal device, a plurality of PUCCH resource sets of different symbol lengths, where PUCCH resources in the PUCCH resource sets are used by the terminal device to feed back the UCI.

To maintain an uplink single-carrier feature of a communications system, the terminal device cannot simultaneously send a plurality of PUCCHs in a frequency division manner, in other words, the terminal device can send only one uplink channel at a same moment. When the plurality of PUCCHs need to be simultaneously sent, how to coordinate feedbacks of a plurality of pieces of uplink control information is a technical problem that needs to be urgently resolved.

SUMMARY

The present invention relates to a communication method, an apparatus, and a system, to implement carrying a plurality of pieces of uplink control information on one uplink channel, thereby improving communication efficiency and performance.

According to a first aspect, an embodiment of this application provides a communication method. The method includes:

receiving, by a terminal device, downlink control information DCI sent by a network device, where the downlink control information indicates a first physical uplink control channel PUCCH, the first PUCCH and a second PUCCH occupy a same first time-domain symbol, the first PUCCH and a third PUCCH occupy a same second time-domain symbol, and both the second PUCCH and the third PUCCH are configured to report scheduling requests SRs;

determining, by the terminal device, a first sequence and a second sequence, sending the first sequence on the first time-domain symbol of the first PUCCH, and sending the second sequence on the second time-domain symbol of the first PUCCH; and receiving, by the network device, the first PUCCH.

For one embodiment, the DCI further includes scheduling information of a downlink data channel, and the first PUCCH is used to carry acknowledgment information of the terminal device for the downlink data channel. Further, the acknowledgment information is an HARQ-ACK for the downlink data channel, or the acknowledgment information is an HARQ-ACK for data transmitted on the downlink data channel. For one embodiment, for the data transmitted on the downlink data channel, the HARQ-ACK may be fed back by using a transport block TB as a unit, or the HARQ-ACK may be fed back by using a code block group CBG as a unit. For one embodiment, acknowledgment information for one or more units (or referred to as one unit bundling) is fed back by using one bit in the HARQ-ACK.

For one embodiment, for the terminal device, a cyclic shift of the first sequence is determined based on a hybrid automatic repeat request-acknowledgment HARQ-ACK value and state information of the SR corresponding to the second PUCCH, and a cyclic shift of the second sequence is determined based on the HARQ-ACK value and state information of the SR corresponding to the third PUCCH.

The first aspect further provides a communication method according to one embodiment. The method includes:

sending, by a network device, downlink control information DCI to a terminal device, and receiving, by the terminal device, the DCI, where the DCI indicates a first physical uplink control channel PUCCH, the first PUCCH and a second PUCCH occupy a same first time-domain symbol, the first PUCCH and a third PUCCH occupy a same second time-domain symbol, and both the second PUCCH and the third PUCCH are configured to report scheduling requests SRs, where the second PUCCH and the third PUCCH are configured to report different scheduling requests SRs; and receiving, by the network device, the first PUCCH, where a cyclic shift of the first sequence is used to indicate a hybrid automatic repeat request-acknowledgment HARQ-ACK value and state information of the SR corresponding to the second PUCCH, and a cyclic shift of the second sequence is used to indicate the HARQ-ACK value and state information of the SR corresponding to the third PUCCH. The DCI further includes scheduling information of a downlink data channel, and the first PUCCH is used to carry acknowledgment information of the terminal device for the downlink data channel. Further, the acknowledgment information is an HARQ-ACK for the downlink data channel, or the acknowledgment information is an HARQ-ACK for data transmitted on the downlink data channel. For one embodiment, acknowledgment information for one or more units (or referred to as one unit bundling) is fed back by using one bit in the HARQ-ACK.

For one embodiment, the network device obtains the first sequence on the first time-domain symbol of the first PUCCH, and obtains the second sequence on the second time-domain symbol of the first PUCCH.

According to the foregoing method, the HARQ-ACK and state information of a plurality of SRs may be reported on a same PUCCH, thereby improving communication efficiency and performance when an uplink single-carrier feature is met.

For one embodiment, a length of a time domain resource of the first PUCCH is two time-domain symbols, and/or the first PUCCH is used to send uplink control information UCI whose length is less than or equal to two bits. Further, for one embodiment, a format of the first PUCCH is a format 0.

For one embodiment, the terminal device determines a first parameter based on the HARQ-ACK value and the state information of the SR corresponding to the second PUCCH, and determines a second parameter based on the HARQ-ACK value and the state information of the SR corresponding to the third PUCCH, where the first parameter is used to determine the cyclic shift of the first sequence, and the second parameter is used to determine the cyclic shift of the second sequence.

For one embodiment, the terminal device determines the first parameter based on a pre-defined mapping relationship, the HARQ-ACK value, and the state information of the SR corresponding to the second PUCCH, and determines the second parameter based on the pre-defined mapping relationship, the HARQ-ACK value, and the state information of the SR corresponding to the third PUCCH.

For one embodiment, the network device determines, based on the first sequence and the second sequence, the HARQ-ACK value, the state information of the SR corresponding to the second PUCCH, and the state information of the SR corresponding to the third PUCCH.

For one embodiment, the network device determines, based on the first parameter and the pre-defined mapping relationship, the HARQ-ACK value and the state information of the SR corresponding to the second PUCCH, and determines, based on the second parameter and the pre-defined mapping relationship, the HARQ-ACK value and the state information of the SR corresponding to the third PUCCH, where the first parameter is obtained based on the cyclic shift of the first sequence, and the second parameter is obtained based on the cyclic shift of the second sequence.

For one embodiment, the first PUCCH carries the HARQ-ACK value and the state information of the SR corresponding to the second PUCCH and the state information of the SR corresponding to the third PUCCH, so that the network device can obtain, in a timely manner, a plurality of pieces of uplink control information on one uplink channel, thereby improving communication efficiency.

For one embodiment, when the state information of the SR corresponding to the second PUCCH is different from the state information of the SR corresponding to the third PUCCH, a value of the first parameter is different from a value of the second parameter; or when the state information of the SR corresponding to the second PUCCH is the same as the state information of the SR corresponding to the third PUCCH, a value of the first parameter is the same as a value of the second parameter.

For one embodiment, the first parameter is $m_{cs}(i)$, the cyclic shift of the first sequence is $\alpha_i$, and $\alpha_i$ and $m_{cs}(i)$ meet the following formula:

$$\alpha_i = \frac{2\pi}{N_{sc}^{RB}}((m_0 + m_{cs}(i) + n_{cs}(n, i + i')) \bmod N_{sc}^{RB}),$$

where i is a symbol number of the first time-domain symbol, i' is a symbol index of a starting symbol of the first PUCCH in time domain within a slot, and $n_{cs}(n,i+i')$ is a pseudo random number determined based on $n$, i, and i'; and the second parameter is $m_{cs}(j)$, the cyclic shift of the first sequence is $\alpha_j$, and $\alpha_j$ and $m_{cs}(j)$ meet the following formula:

$$\alpha_j = \frac{2\pi}{N_{sc}^{RB}}((m_0 + m_{cs}(j) + n_{cs}(n, j + j')) \bmod N_{sc}^{RB}),$$

where j is a symbol number of the second time-domain symbol, j' is a symbol index of the starting symbol of the first PUCCH in time domain within the slot, and $n_{cs}(n,j+j')$ is a pseudo random number determined based on $n$, j, and j', where $n$ is a slot number in a radio frame in which the first time-domain symbol i and the second time-domain symbol j are located, $m_0$ is a parameter configured by using higher layer signaling, and $N_{sc}^{RB}$ is a quantity of subcarriers included in one resource block RB.

In the design, based on the prior art, only a parameter value used to determine the cyclic shift may be associated with state information of another type of UCI configured for transmission on an overlapping symbol, so as to implement reporting of a plurality of types of the UCI on a same PUCCH, thereby improving communication efficiency on the premise of making a small change to the prior art.

For one embodiment, the state information of the SR is a positive state or a negative state.

According to a second aspect, an embodiment of the present invention provides an apparatus. The apparatus may be a wireless apparatus, for example, a terminal device, and the apparatus includes a processor, a receiver, and a transmitter, where the receiver is configured to receive downlink control information DCI sent by a network device, where the downlink control information indicates a first physical uplink control channel PUCCH, the first PUCCH and a second PUCCH occupy a same first time-domain symbol, the first PUCCH and a third PUCCH occupy a same second time-domain symbol, and both the second PUCCH and the third PUCCH are configured to report scheduling requests SRs; and the transmitter is configured to: send a first sequence on the first time-domain symbol of the first PUCCH, and send a second sequence on the second time-domain symbol of the first PUCCH, where a cyclic shift of the first sequence is determined based on a hybrid automatic repeat request-acknowledgment HARQ-ACK value and state information of the SR corresponding to the second PUCCH, and a cyclic shift of the second sequence is determined based on the HARQ-ACK value and state information of the SR corresponding to the third PUCCH.

For one embodiment, the processor is configured to: determine a first parameter based on the HARQ-ACK value and the state information of the SR corresponding to the second PUCCH, and determine a second parameter based on the HARQ-ACK value and the state information of the SR corresponding to the third PUCCH, where the first parameter is used to determine the cyclic shift of the first sequence, and the second parameter is used to determine the cyclic shift of the second sequence.

For one embodiment, the processor is configured to: determine the first parameter based on a pre-defined mapping relationship, the HARQ-ACK value, and the state information of the SR corresponding to the second PUCCH, and determine the second parameter based on the pre-defined mapping relationship, the HARQ-ACK value, and the state information of the SR corresponding to the third PUCCH.

The second aspect further provides an apparatus. The apparatus may be a wireless apparatus, for example, a network device, and the apparatus includes a processor, a transmitter, and a receiver, where the transmitter is configured to send downlink control information DCI to a terminal device, where the downlink control information indicates a first physical uplink control channel PUCCH, the first PUCCH and a second PUCCH occupy a same first time-domain symbol, the first PUCCH and a third PUCCH occupy a same second time-domain symbol, and both the second PUCCH and the third PUCCH are configured to report scheduling requests SRs; and the receiver is configured to: receive the first PUCCH, and the receiver is further configured to receive a first sequence on the first time-domain symbol of the first PUCCH, and receive a second sequence on the second time-domain symbol of the first PUCCH, where a cyclic shift of the first sequence is used to indicate a hybrid automatic repeat request-acknowledgment HARQ-ACK value and state information of the SR corresponding to the second PUCCH; and a cyclic shift of the second sequence is used to indicate the HARQ-ACK value and state information of the SR corresponding to the third PUCCH.

For one embodiment, the processor determines the HARQ-ACK value, the state information of the SR corresponding to the second PUCCH, and the state information of the SR corresponding to the third PUCCH, and the processor further determines, based on the first sequence and the second sequence, the HARQ-ACK value, the state information of the SR corresponding to the second PUCCH, and the state information of the SR corresponding to the third PUCCH.

For one embodiment, the processor is configured to: determine, based on a first parameter and a pre-defined mapping relationship, the HARQ-ACK value and the state information of the SR corresponding to the second PUCCH, and determine, based on a second parameter and the pre-defined mapping relationship, the HARQ-ACK value and the state information of the SR corresponding to the third PUCCH, where the first parameter is obtained based on the cyclic shift of the first sequence, and the second parameter is obtained based on the cyclic shift of the second sequence.

For details, parameters, and the like in the foregoing apparatus, refer to the description of the method in the first aspect.

According to a third aspect, the present invention provides a system, including at least two apparatuses provided in the foregoing second aspect.

According to a fourth aspect, the present invention provides a wireless apparatus, including one or more processors and a memory, where the memory stores a computer program; and when the one or more processors execute the computer program, the apparatus is enabled to implement any method performed by the terminal device or any method performed by the network device according to the first aspect.

According to a fifth aspect, the present invention provides a computer storage medium storing a computer program, where the computer storage medium stores the computer program; and when the computer program is executed by a processor, a computer, or a device, any method performed by the terminal device or any method performed by the network device according to the first aspect is implemented.

According to a sixth aspect, the present invention provides a computer program product including an instruction; and when the computer program product is run on a computer, the computer is enabled to perform any method performed by the terminal device or any method performed by the network device according to the first aspect.

According to a seventh aspect, the present invention provides a chip system. The chip system includes a processor, configured to support any apparatus provided in the second aspect in implementing the functions in the foregoing first aspect, for example, generating or processing data and/or information in the foregoing method. In a possible design, the chip system further includes a memory, where the memory is configured to store a program instruction and data that are necessary to a network device or a communications apparatus. The chip system may include a chip, or may include a chip and another discrete device.

According to an eighth aspect, the present invention provides a chip. The chip includes a processing module and a communications interface, where the processing module is configured to control the communications interface to communicate with the outside, and the processing module is further configured to implement any method performed by the terminal device or any method performed by the network device according to the first aspect.

Compared with the prior art, in the solutions provided in the embodiments of the present invention, the plurality of pieces of uplink control information may be reported on one uplink channel on the premise that the uplink single-carrier feature is met, so that the network device may obtain, in the timely manner, the uplink control information sent by the terminal device, thereby improving the communication efficiency of the communications system.

BRIEF DESCRIPTION OF DRAWINGS

The following describes in more details the embodiments of the present invention with reference to the accompanying drawings.

DESCRIPTION OF EMBODIMENTS

The network architecture and the service scenario described in the embodiments of the present invention are intended to describe the technical solutions in the embodiments of the present invention more clearly, and do not constitute a limitation on the technical solutions provided in the embodiments of the present invention. A person of ordinary skill in the art may know that: With the evolution of the network architecture and the emergence of new service scenarios, the technical solutions provided in the embodiments of the present invention are also applicable to similar technical problems.

In the embodiments of the present invention, "a plurality of" refers to two or more than two. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects. The "first" and "second" in the embodiments of the present invention are merely used to indicate one of a plurality of objects, and are not limited in any sequence or order.

Figure 1:
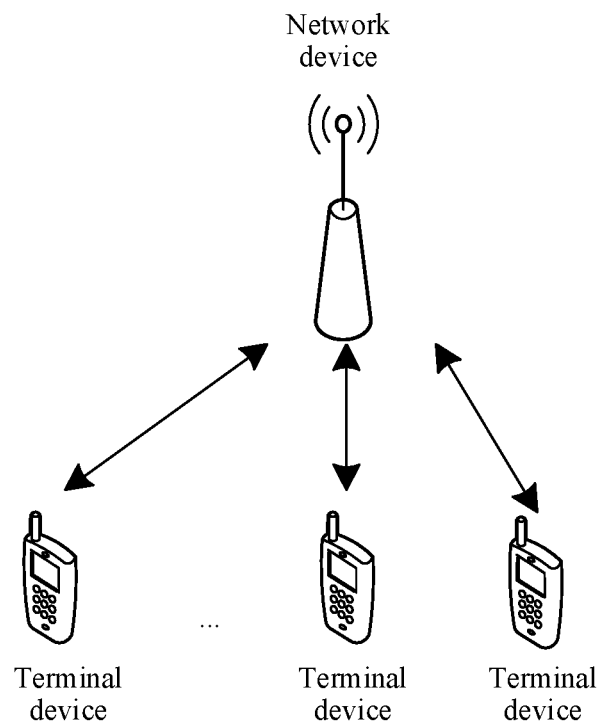
FIG. 1 is a schematic diagram of a possible application scenario according to an embodiment of the present invention.

FIG. 1 is a schematic diagram of a possible application scenario according to an embodiment of the present invention. A communications system in the application scenario includes a network device and one or more terminal devices. The network device may communicate with the terminal devices by using one or more air interface technologies.

The following describes terms that may appear in the embodiments of the present invention.

The communications system may be applicable to a long term evolution (LTE) system or other wireless communications systems that use various wireless access technologies, for example, systems that use access technologies such as code division multiple access, frequency division multiple access, time division multiple access, orthogonal frequency division multiple access, and single carrier frequency division multiple access. In addition, the communications system may alternatively be applicable to a system subsequently evolved from the LTE system, for example, a fifth-generation 5G system.

The network device may be a base station, an access point, or an access network device, or may be a device in communication with a wireless terminal via one or more sectors at an air interface in an access network. The network device may be configured to: mutually convert a received over-the-air frame and an IP packet and serve as a router between the wireless terminal and a rest portion of the access network, where the rest portion of the access network may include an Internet protocol (IP) network. The network device may further coordinate attribute management of the air interface. For example, the network device may be a base transceiver station (BTS) in a global system for mobile communications (GSM) or code division multiple access (CDMA), a NodeB (NB) in wideband code division multiple access (WCDMA), or may be an evolved NodeB (eNB, or eNodeB) in long term evolution (LTE), a relay station or an access point, or a base station in a future 5G network, for example, a gNB. This is not limited herein. It should be noted that, in the 5G or NR system, there may be one or more transmission reception points (TRP) in a base station of an NR scheduling function. All of the TRPs belong to a same cell, and each TRP and each terminal can use a measurement reporting method described in the embodiments of this application. In another scenario, the network device may be further divided into a control unit (CU) and a data unit (DU). There may be a plurality of DUs in one CU. Each DU and each terminal may use the measurement reporting method described in the embodiments of this application. A difference between a CU-DU separation scenario and a multi-TRP scenario lies in that the TRP is merely a radio frequency unit or an antenna device, while a protocol stack function can be implemented in the DU. For example, a physical layer function can be implemented in the DU.

The terminal device may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, a user device (or User Equipment). This is not limited herein.

A symbol includes but is not limited to an orthogonal frequency division multiplexing (OFDM) symbol, a sparse code multiple access (SCMA) symbol, a filtered orthogonal frequency division multiplexing (F-OFDM) symbol, and a non-orthogonal multiple access (NOMA) symbol. The symbol may be specifically determined based on an actual situation. Details are not described herein.

One subframe occupies, in frequency domain, a time-frequency resource of entire system bandwidth, and occupies a fixed time length, for example, 1 millisecond (ms), in time domain. In addition, one subframe may alternatively occupy K consecutive symbols, where K is a natural number greater than zero. A value of K may be determined based on an actual situation, and is not limited herein. For example, in the LTE, one subframe occupies 14 consecutive OFDM symbols in time domain.

A slot is a basic time-domain resource unit, and occupies L consecutive OFDM symbols in time domain, where L is a natural number greater than zero. A value of L may be determined based on an actual situation. For example, seven OFDM symbols may be occupied.

A cyclic shift (CS) refers to a complex-number phase shift or a sequence shift performed on a generated complex sequence when a signal is generated, or is equivalent to a time-domain operation of frequency-domain phase rotation. In the embodiments of the present invention, the cyclic shift is performed on a base sequence to obtain a sequence that is actually sent on a channel.

Uplink control information includes but is not limited to one or more pieces of the following information:

Feedback information: Specifically, in the embodiments of the present invention, a feedback technology may be used for downlink data transmission. As an example rather than a limitation, the feedback technology may include, for example, a hybrid automatic repeat request (HARQ) technology. The HARQ technology is a technology formed by combining forward error correction (FEC) coding and an automatic repeat request (ARQ). For example, in the HARQ technology, after receiving data from a transmit end, a receive end may determine whether the data can be correctly decoded. If the data cannot be accurately decoded, the receive end may feed back negative-acknowledge (NACK) information to the transmit end, so that the transmit end can determine, based on the NACK information, that the receive end does not accurately receive the data, and then perform retransmission. If the data can be accurately decoded, the receive end may feed back acknowledge (ACK) information to the transmit end, so that the transmit end can determine, based on the ACK information, that the receive end accurately receives the data, and then determine that data transmission is completed. In the embodiments of the present invention, when the data is decoded successfully, the receive end may feed back the ACK information to the transmit end. When the data fails to be decoded, the receive end may feed back the NACK information to the transmit end. As an example rather than a limitation, in the embodiments of the present invention, the uplink control information may include the ACK information or the NACK information in the HARQ technology. It should be understood that the foregoing enumerated content included in the feedback information is only an example for description, and the present invention is not limited thereto.

Channel state information (CSI): In the field of wireless communications, the CSI may be a channel attribute of a communications link. The channel state information describes an attenuation factor of a signal on each transmission path, that is, a value of each element in a channel gain matrix H, such as signal scattering, environment fading (multipath fading or shadowing fading), power decay of distance, or other information. The CSI may enable the communications system to adapt to a current channel condition, and provide assurance for high-reliability and high-rate communication in a multi-antenna system.

Channel quality indicator (CQI) information: The CQI may be used to reflect channel quality of a physical downlink shared channel (PDSCH).

Scheduling request (SR): When the terminal device has an uplink data sending request, the terminal device sends the scheduling request SR on a corresponding uplink resource, to notify the network device that there is uplink data that needs to be sent. State information of the SR may be a positive state or a negative state. The positive state means that there is uplink data that needs to be sent, and the negative state means that there is no uplink data that needs to be sent. According to different types of scheduling requests, the terminal device sends corresponding SRs on different uplink resources. An SR in the positive state may be sent, and the network device can obtain energy on a corresponding uplink resource through detection. An SR in the negative state is not sent, and the network device cannot obtain energy on a corresponding uplink resource through detection, or obtains extremely weak energy through detection. Usually, different types of SRs correspond to different uplink resources, and the uplink resources are pre-configured by the network device. When there is a positive SR that needs to be triggered or sent, the terminal device sends a request on an uplink resource corresponding to the SR. It should be noted herein that SR type division is not specifically limited in the embodiments of the present invention. Specifically, SR types may be divided based on one or more of a type, an attribute, a priority, a wireless network status, a device requirement, or the like of a service or a session. For example, the NR includes an ultra-reliable and low-latency communications (uRLLC) service, an enhanced mobile broadband (eMBB) service, and a massive machine-type communications (mMTC) service. If SR types are divided based on a service attribute that is a transmission latency requirement, scheduling requests SRs for each of the URLLC, the eMBB, and the mMTC may be divided into different types.

Figure 2:
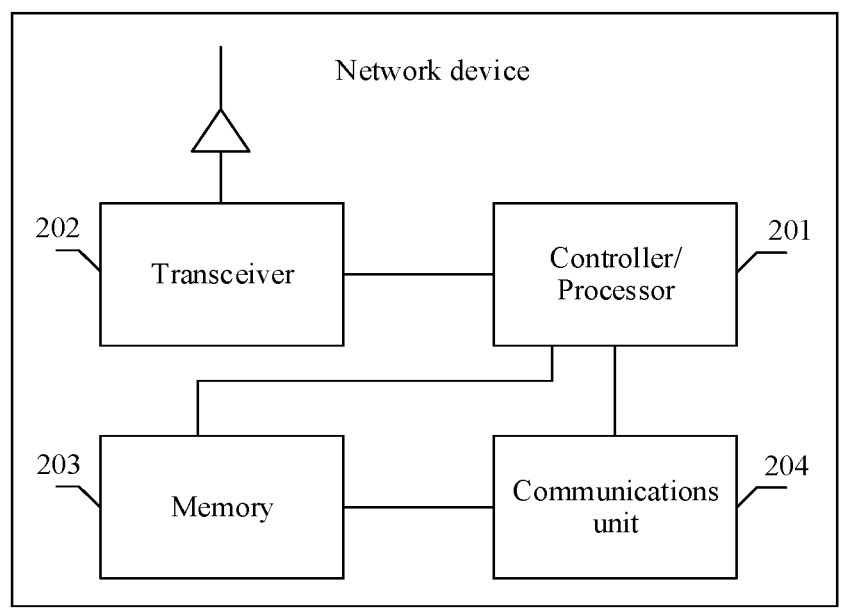
FIG. 2 is a possible schematic structural diagram of a network device according to an embodiment of the present invention.

Further, a possible schematic structural diagram of the foregoing network device may be shown in FIG. 2. The network device 102 can perform the method provided in the embodiments of the present invention. The network device 102 may include a controller/processor 201 (the following uses the processor 201 as an example for description) and a transceiver 202. The controller/processor 201 is sometimes referred to as a modem processor. The transceiver 202 may include an independent receiver 202A and an independent transmitter 202B. The modem processor 201 may include a baseband processor (BBP) (not shown). The baseband processor processes a received digitized signal, to extract information or a data bit transmitted in the signal. In this way, the BBP is usually implemented in one or more digital signal processors (DSP) in the modem processor 201 as required or as expected, or is implemented as a separated integrated circuit (IC).

The transceiver 202 may be configured to: support information receiving and sending between the network device and the terminal device, and support radio communication between terminal devices. The processor 201 may be further configured to execute various functions of communication between the terminal device and another network device. On an uplink, an uplink signal that is from the terminal device is received by using an antenna, demodulated by the transceiver 202, and further processed by the processor 201, to restore service data and/or signaling information sent by the terminal device. On a downlink, the service data and/or the signaling message are/is processed by the terminal device and modulated by the transceiver 202 to generate a downlink signal, and the downlink signal is transmitted to the terminal device by using the antenna. The network device may further include a memory 203, and the memory 203 may be configured to store program code and/or data of the network device. The transceiver 202 may include an independent receiver circuit and an independent transmitter circuit, or may be a circuit implementing receiving and sending functions. The network device may further include a communications unit 204, configured to support the network device in communicating with another network entity. For example, the communications unit 204 is configured to support the network device in communicating with a network device or the like in a core network.

For one embodiment, the network device may further include a bus. The transceiver 202, the memory 203, and the communications unit 204 may be connected to the processor 201 by using the bus. For example, the bus may be a peripheral component interconnect (PCI) bus, an extended industry standard architecture (EISA) bus, or the like. The bus may include an address bus, a data bus, a control bus, and the like.

Figure 3:
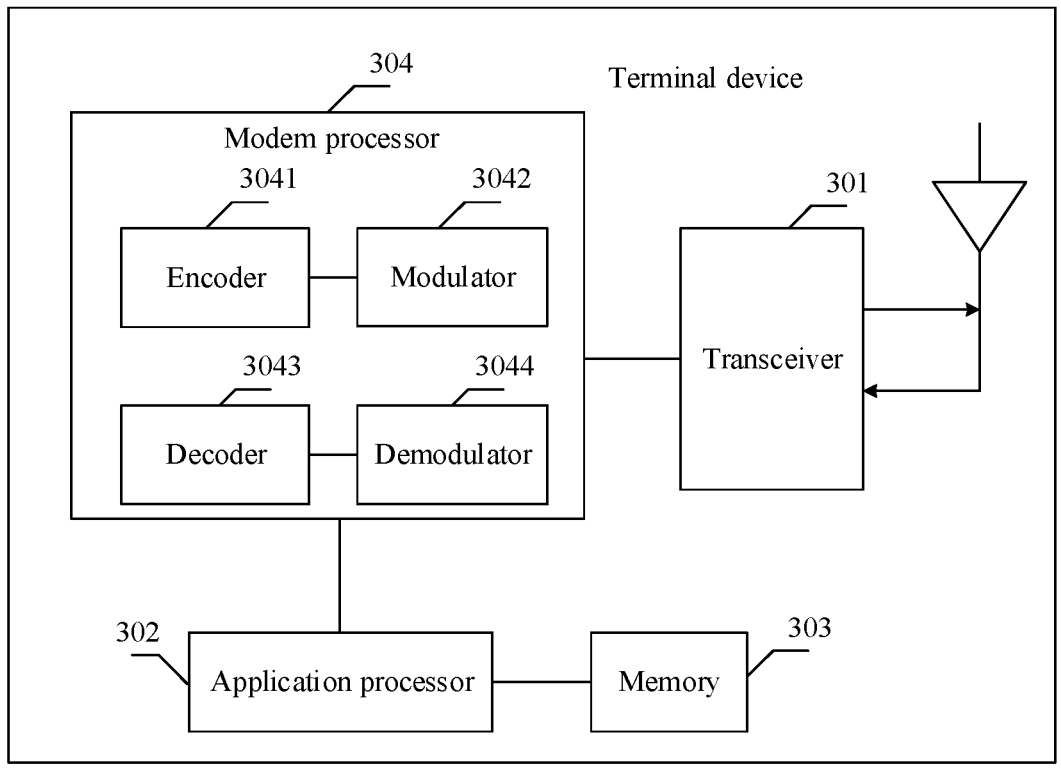
FIG. 3 is a possible schematic structural diagram of a terminal device according to an embodiment of the present invention.

FIG. 3 is a possible schematic structural diagram of a terminal device in the foregoing communications system. The terminal device can perform the method provided in the embodiments of the present invention. The terminal device may be any one of one or more terminal devices in FIG. 1. The terminal device includes a transceiver 301, an application processor 302, a memory 303, and a modem processor 304. The transceiver 301 may include an independent receiver 301A and an independent transmitter 301B.

The transceiver 301 may adjust (for example, perform analog conversion, filtering, amplification, and up-conversion on) an output sample and generate an uplink signal. The uplink signal is transmitted to the base station in the foregoing embodiment by using an antenna. On a downlink, the antenna receives a downlink signal transmitted by a network device. The transceiver 301 may adjust (for example, perform filtering, amplification, down-conversion, and digitalization on) a signal received from the antenna and provide an input sample.

Sometimes, the modem processor 304 is also referred to as a controller/processor, and may include a baseband processor (BBP) (not shown). The baseband processor processes a received digitized signal, to extract information or a data bit transmitted in the signal. The BBP is usually implemented in one or more digits in the modem processor 304 as required or as expected, or is implemented as a separated integrated circuit (IC).

In a design, the modem processor 304 may include an encoder 3041, a modulator 3042, a decoder 3043, and a demodulator 3044. The encoder 3041 is configured to encode a to-be-sent signal. For example, the encoder 3041 may be configured to receive service data and/or a signaling message that are/is to be sent on an uplink, and perform processing (for example, formatting, encoding, or interleaving) on the service data and the signaling message. The modulator 3042 is configured to modulate an output signal of the encoder 3041. For example, the modulator may perform processing such as symbol mapping and/or modulation on the output signal (data and/or signaling) of the encoder, and provide an output sample. The demodulator 3044 is configured to perform demodulation processing on an input signal. For example, the demodulator 3044 processes an input sample and provides symbol estimation. The decoder 3043 is configured to decode the demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by the combined modem processor 304. The units perform processing based on a radio access technology used by a radio access network.

The modem processor 304 receives, from the application processor 302, digitized data that may represent voice, data, or control information, and processes the digitized data for transmission. The modem processor may support one or more pluralities of wireless communication protocols of a plurality of communications systems, for example, LTE, new radio, a universal mobile telecommunications system (UMTS), and high speed packet access (HSPA). For one embodiment, the modem processor 304 may also include one or more memories.

For one embodiment, the modem processor 304 and the application processor 302 may be integrated into one processor chip.

The memory 303 is configured to store program code (sometimes also referred to as a program, an instruction, software, or the like) and/or data that are/is used to support the terminal device in communication.

It should be noted that the memory 203 or the memory 303 may include one or more storage units, for example, may be a storage unit that is in the processor 201 or the modem processor 304 or the application processor 302 and that is used to store the program code, or may be an external storage unit independent of the processor 201 or the modem processor 304 or the application processor 302, or may further be a component including a storage unit that is in the processor 201 or the modem processor 304 or the application processor 302 and an external storage unit that is independent of the processor 201 or the modem processor 304 or the application processor 302.

The processor 201 and the modem processor 304 (or processor 304) may be processors of a same type, or may be processors of different types. For example, the processor 201 and processor 304 each may be implemented as a central processing unit (CPU), a general purpose processor, a digital signal processor (DSP), an application-specific integrated circuit (ASIC), a field programmable gate array (FPGA) or another programmable logic device, a transistor logic device, a hardware component, another integrated circuit, or any combination thereof. The processor 201 and the modem processor 304 may implement or execute various example logical blocks, modules, and circuits described with reference to content disclosed in the embodiments of the present invention. Alternatively, the processor may be a combination of components implementing computing functions, for example, a combination of one or more microprocessors, a combination of a DSP and a microprocessor, or a system-on-a-chip (SOC).

A person skilled in the art can understand that various explanatory logic blocks, modules, circuits, and algorithms described with reference to the various aspects disclosed in this application may be implemented as electronic hardware, an instruction that is stored in a memory or another computer-readable medium and that is executed by a processor or another processing device, or a combination thereof. As an example, the devices described in this specification may be used in any circuit, hardware component, IC, or IC chip. The memory disclosed in this application may be any type of memory in any size, and may be configured to store any type of required information. To clearly explain such interchangeability, various explanatory components, blocks, modules, circuits, and operations have been generally described above based on functionality. How to implement such functionality depends on a specific application, a design selection, and/or a design constraint that is imposed on an entire system. A person skilled in the art may use different manners to implement the described functionality for each particular application, but it should not be considered that such implementation goes beyond the scope of the present invention.

In the embodiments of the present invention, sending an uplink (downlink) channel may be sending data or information carried on the uplink (downlink) channel, where the data or the information may be data or information obtained after channel coding.

The network device configures one or more PUCCH resource sets for the terminal device by using higher layer signaling. For one embodiment, each PUCCH resource set corresponds to a range of a UCI bit length, that is, a plurality of PUCCH sets are respectively used to transmit UCI of different bit length ranges, and each of the plurality of PUCCH resource sets includes at least eight PUCCH resources. The network device notifies the terminal device of resource information of PUCCH resources in the PUCCH resource set, where the PUCCH resource information includes but is not limited to at least one of a PUCCH resource index, a PUCCH format, a starting symbol index, a quantity of symbols (number of symbols), a start physical resource block PRB index, and a quantity of PRBs. The PUCCH format may be a PUCCH format 0, a PUCCH format 1, a PUCCH format 2, a PUCCH format 3, a PUCCH format 4, or the like. For one embodiment, the PUCCH format may alternatively be any possible format in a future communications system. This is not specifically limited herein. The terminal device obtains, by using the higher layer signaling sent by the network device, the plurality of PUCCH resource sets used to transmit the UCI of different bit length ranges. For example, if the terminal device obtains a PUCCH resource set used to transmit UCI whose length is less than or equal to 2 bits, the PUCCH format may be the format 0 or the format 1, or if the terminal device obtains a PUCCH resource set used to transmit UCI whose length is greater than 2 bits and less than or equal to 10 bits, the PUCCH format may be the format 2 or the format 4.

It should be noted that for an HARQ-ACK and/or CSI, the terminal device may determine a corresponding PUCCH resource set based on a bit length range of the UCI that needs to be transmitted. Further, the network device indicates one PUCCH resource in one PUCCH resource set by using downlink control information. For example, the network device indicates the PUCCH resource index, to notify the terminal device to use which PUCCH resource in one PUCCH resource set to report the HARQ-ACK and/or the CSI. A difference is that when configuring a PUCCH resource set for an SR, the network device configures a periodicity and an offset of the SR in addition to configuring the resource information including information such as the PUCCH resource index, the PUCCH format, and the like. The terminal device may distinguish, by using the PUCCH resource index of the SR, SR PUCCH resources configured for different SRs, that is, there is a correspondence between an SR and a PUCCH resource index configured for the SR. The correspondence is pre-configured. For one embodiment, different SR PUCCH resources correspond to different configuration, and different SR PUCCH resources correspond to different PUCCH resource indexes. Further, for one embodiment, different SR PUCCH resource indexes correspond to different SR types, or a plurality of different SR PUCCH resource indexes correspond to a same SR type. It should be noted herein that the terminal device can determine, based on a mapping relationship between the SR type and the physical layer index, the SR type corresponding to the PUCCH resource index, and then may send the SR on the PUCCH resource corresponding to the SR type when there is a corresponding session or service requirement. However, the mapping relationship is transparent at a physical layer. The one or more PUCCH resource sets configured by the network device for SR reporting are different from the one or more PUCCH resource sets configured by the network device for HARQ-ACK reporting and/or CSI reporting. For logical division of SR types, refer to the foregoing description in this specification.

The PUCCH format information includes a plurality of formats, for example, the format 0 and the format 1. A PUCCH with the format 0 occupies one symbol or two symbols in time domain. Use the format 0 as an example, the terminal device sends a low peak-to-average power ratio (PAPR) sequence on the PUCCH with the format 0, where the sequence is obtained by performing a cyclic shift on a basic sequence, and the cyclic shift α may be used to carry the UCI, for example, the HARQ-ACK. After processing the sequence, the network device determines, based on the cyclic shift α, the UCI fed back by the terminal device.

Further, the UCI may be carried by using a parameter used to determine the cyclic shift α, and a cyclic shift $α_l$ of the sequence sent on a symbol l meets the following formula:

$$α_l = \frac{2π}{N_{sc}^{RB}}((m_0 + m_{cs} + n_{cs}(n_{s,f}^μ, l + l'))\bmod N_{sc}^{RB}),$$ Formula (1).

In the formula (1), l is a symbol number (symbol number) of a symbol in time domain of the first PUCCH, and the symbol number may be determined based on an order of the symbol in time domain of the first PUCCH. For example, a number of a starting symbol in time domain of the first PUCCH is 0, that is, the starting symbol is a symbol 0. $n_{s,f}^μ$ is a slot number (slot number) in a radio frame in which the symbol l is located. l' is a symbol index of a starting symbol of the first PUCCH in time domain within the slot. For example, if the slot includes 14 symbols, a value range of l' may be one of 0, 1, . . . , and 13. $n_{cs}(n_{s,f}^μ, l+l')$ is a pseudo random number determined based on a function $n_{cs}$ by using $n_{s,f}^μ$, l, and l' as parameters. Further, for one embodiment, $n_{s,f}^μ$ is a parameter μ corresponding to subcarrier spacing configuration (or a parameter set numerology), and is a slot number (slot number) of a current slot in the frame. The formula may be: $n_{cs}(n_{s,f}^μ, p) = Σ_{q=0}^{7} 2^q c(14·8 n_{s,f}^μ + 8p + q)$. The function c( ) is an existing pseudo-random sequence generation function, and for details, refer to the prior art. $m_0$ is a pre-configured parameter, for example, configured by using the higher layer signaling. Specifically, the parameter may be directly indicated by using the higher layer signaling, or may be obtained through configuration or may be implicitly indicated by using the higher layer signaling, and for details, refer to the prior art. π is a circular rate constant parameter. $N_{sc}^{RB}$ is a quantity of subcarriers included in one resource block (RB). For example, a value of $N_{sc}^{RB}$ in NR is 12, and mod is a modulo operation. For a same parameter in another formula obtained by transforming the formula in the following, refer to the explanation in this paragraph.

When the cyclic shift α is determined, the value of $m_{cs}$ may be determined with reference to a pre-defined mapping relationship, and the mapping relationship is used to indicate a value of $m_{cs}$ corresponding to a value of the UCI. For example, the mapping relationship may be embodied in a table manner. For details, refer to Table 1 and Table 2. When the HARQ-ACK is transmitted by using a PUCCH with the format 0 and whose time domain length is two symbols, each symbol in the two symbols carries a value of the to-be-transmitted HARQ-ACK, to implement enhanced transmission of the HARQ-ACK and improve communication quality. For each symbol l, a cyclic shift $α_l$ used to carry the HARQ-ACK value is determined according to the foregoing formula (1). The number l of the symbol may be determined based on a sequence of the symbol in time domain of the PUCCH. For example, a number of a starting symbol in time domain of the PUCCH is 0, that is, the starting symbol is a symbol 0, and a number of a second symbol in time domain of the PUCCH is 1, that is, the second symbol is a symbol 1.

TABLE 1

Mapping from a 1-bit HARQ-ACK to a sequence cyclic shift

| HARQ-ACK value | 0 | 1 |
|---|---|---|
| Sequence cyclic shift | $m_{cs} = 0$ | $m_{cs} = 6$ |

TABLE 2

Mapping from a 2-bit HARQ-ACK to a sequence cyclic shift

| HARQ-ACK value | {0, 0} | {0, 1} | {1, 1} | {1, 0} |
|---|---|---|---|---|
| Sequence cyclic shift | $m_{cs} = 0$ | $m_{cs} = 3$ | $m_{cs} = 6$ | $m_{cs} = 9$ |

In a communication process, the network device performs resource configuration based on a time domain resource, and inevitably, a collision of PUCCHs used to transmit different types of UCI occurs in time domain. UCI resource multiplexing is a major means to maintain an uplink single-carrier feature and solve a sending problem that a plurality of PUCCHs overlap or collide in time domain. During a UCI feedback, a plurality of pieces of UCI with overlapped or colliding PUCCH time domain resources may be multiplexed onto one PUCCH resource for sending. In this way, the uplink single-carrier feature is maintained, and the plurality of pieces of UCI may be reported at the same time, thereby improving system communication efficiency.

If a PUCCH configured to transmit the HARQ-ACK and a PUCCH configured to transmit a first SR overlap or partially overlap in time domain, state information of the first SR may be multiplexed on information carrying the HARQ-ACK, for example, a parameter $m_{cs}$ used to determine the cyclic shift. Table 1 and Table 2 have already defined the mapping relationship between the HARQ-ACK value and $m_{cs}$. Table 3 and Table 4 define a mapping relationship between a value of $m_{cs}$, an HARQ-ACK value, and an SR in a positive state when HARQ-ACK values are separately 1 bit and 2 bits. The overlapping or partial overlapping herein means that the PUCCH resource used to transmit the HARQ-ACK and the PUCCH resource used to transmit the first SR include the same one or more symbols in time domain. For example, the PUCCH configured to transmit the HARQ-ACK occupies two symbols in time domain, and the PUCCH resource configured to transmit the first SR includes one symbol or both the two symbols in time domain.

TABLE 3

Mapping from a 1-bit HARQ-ACK and an SR in a positive state to a sequence cyclic shift

| HARQ-ACK value | 0 | 1 |
|---|---|---|
| Sequence cyclic shift | $m_{cs} = 3$ | $m_{cs} = 9$ |

TABLE 4

Mapping from a 2-bit HARQ-ACK and an SR in a positive state to a sequence cyclic shift

| HARQ-ACK value | {0, 0} | {0, 1} | {1, 1} | {1, 0} |
|---|---|---|---|---|
| Sequence cyclic shift | $m_{cs} = 1$ | $m_{cs} = 4$ | $m_{cs} = 7$ | $m_{cs} = 10$ |

It can be learned from Table 3 and Table 4 that when the PUCCH resources configured to transmit the HARQ-ACK and the first SR overlap or partially overlap in time domain, if the first SR is in the positive state, that is, the terminal device needs to send the first SR to request the network device to perform resource scheduling, the terminal device determines a parameter $m_{cs}$ of the sequence cyclic shift based on Table 3 or Table 4, and further determines, based on $m_{cs}$, to send, on the PUCCH configured to transmit the HARQ-ACK, a low PAPR sequence generated based on $m_{cs}$; or if the first SR is in a negative state, that is, the terminal device does not have a corresponding service scheduling request, and does not need to send the first SR, the terminal device determines a parameter $m_{cs}$ of the sequence cyclic shift based on Table 1 or Table 2, and further determines, based on $m_{cs}$, to send, on the PUCCH configured to transmit the HARQ-ACK, a low PAPR sequence generated based on $m_{cs}$. After obtaining the low PAPR sequence through detection, the network device determines, based on the value of $m_{cs}$ obtained by parsing the sequence, the HARQ-ACK value and that the first SR is in the positive or negative state, so that two pieces of UCI are multiplexed on a same PUCCH resource.

Figure 4:
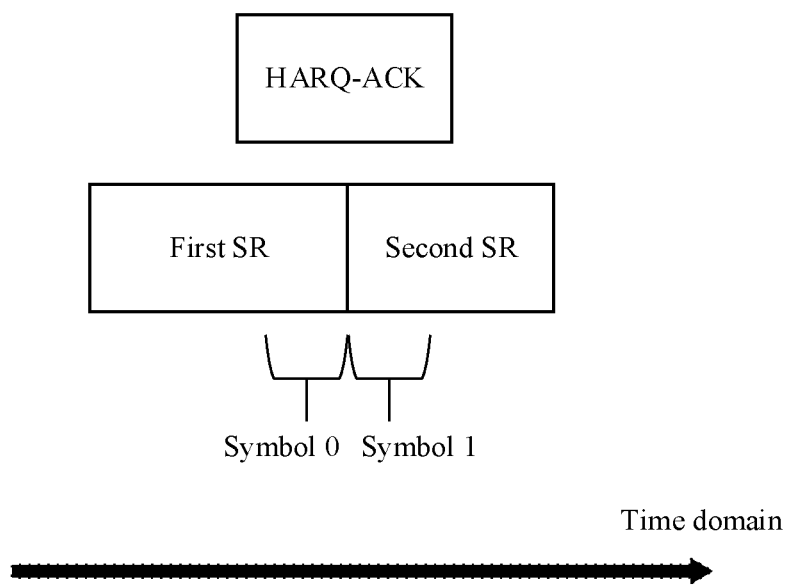
FIG. 4 is a schematic diagram of a PUCCH time domain resource collision.

In an actual communication process, the terminal device may have a plurality of types of scheduling requests, that is, the PUCCH configured to transmit the HARQ-ACK and PUCCHs configured to transmit a plurality of different SRs may overlap or partially overlap in time domain. For details, refer to FIG. 4. In this case, state information of the plurality of SRs and the HARQ-ACK cannot be accurately multiplexed, based on Tables 1 to 4, on the PUCCH configured to transmit the HARQ-ACK. It should be noted herein that the mapping relationship between $m_{cs}$ and an HARQ-ACK value and/or state information of an SR defined in Tables 1 to 4 is only a specific selection, and is used to represent that a pre-defined mapping relationship exists between $m_{cs}$ and the HARQ-ACK value and/or the state information of the SR, a value of $m_{cs}$ corresponding to a specific HARQ-ACK value and/or state information of an SR in the table may be modified or replaced, to form new Tables 1 to 4 or at least one other table that can reflect the pre-defined mapping relationship. When the mapping relationship is determined based on the table or Tables 1 to 4, the following embodiments of the present invention are not limited to the foregoing Tables 1 to 4, and may be at least one other table that can indicate the mapping relationship and that is obtained by modifying or updating the foregoing Tables 1 to 4.

In an optional solution, an "or" operation is performed on the state information of the plurality of SRs, that is, provided that an SR in a positive state exists in the plurality of SRs, the terminal device implements multiplexing of the HARQ-ACK and state information of the SR based on Table 3 or Table 4. However, the network device cannot identify an SR that corresponds to a specific PUCCH resource index and for which the terminal device reports a scheduling request or a specific type of SR for which the terminal device reports a scheduling request. Consequently, the network device cannot accurately perform the resource scheduling. For example, a uRLLC service requires a data transmission latency to be less than 0.5 ms, a probability of successfully transmitting data is greater than or equal to 99.999%, a latency requirement and a reliability requirement of eMBB are lower than those of the uRLLC service, and a latency requirement of an mMTC service is the lowest. In this case, for SRs corresponding to different service types, the network device may configure a corresponding resource for the terminal device based on a corresponding service type. If the service type cannot be identified, the resource configured by the network device may not meet a service requirement, or unnecessary resource configuration costs are increased.

In another optional solution, only state information of an SR in the plurality of SRs is reported. An SR herein is determined from the plurality of SRs based on a pre-defined or configured rule, for example, priority information or a starting time of the SR. In the solution, state information of another SR in the plurality of SRs is not reported to the network device temporarily. Therefore, the network device cannot obtain, in a timely manner, whether there is a session or service scheduling request corresponding to the another SR, and can only wait for a PUCCH that is in a next periodicity and that is configured to transmit the another SR to obtain a corresponding SR.

In still another optional solution, if the PUCCH configured to transmit the HARQ-ACK or the CSI can transmit UCI of a relatively large quantity of bits, for example, more than 2 bits, more than 10 bits, or more bits, state information of some or all of the plurality of SRs may be sent together with the HARQ-ACK or the CSI information in a bit manner. For one embodiment, the terminal device may place at least one bit that indicates the state information of the some or all of the SRs after the bit used to indicate the HARQ-ACK or the CSI, and send the bits to the network device by using the PUCCH configured to transmit the HARQ-ACK or the CSI. However, the solution is only applicable to a PUCCH format that can transmit the UCI of a relatively large quantity of bits. A PUCCH configured to transmit UCI of a relatively small quantity of bits, for example, a PUCCH with the format 0 and that is configured to transmit information less than or equal to 2 bits, cannot occupy a bit in the information to carry another type of UCI.

It can be learned from the foregoing description that, in the foregoing solution, there is a problem that first-type UCI and a plurality of pieces of second-type UCI cannot be multiplexed on the PUCCH that can only transmit the UCI of a relatively small quantity of bits. Specifically, the PUCCH whose format information is the PUCCH format 0 cannot implement a feedback and reporting of the first-type UCI and the plurality of pieces of second-type UCI. For example, when a time domain length of the PUCCH resource configured to transmit the first-type UCI is two symbols, if there is a situation that PUCCH resources configured to transmit two pieces of second-type UCI (for example, the SR) each include one of the two symbols, due to a requirement of enhanced HARQ-ACK information transmission, the two pieces of second-type UCI or state information of the two pieces of second-type UCI (SR) cannot be accurately reported when the first-type UCI is reported to the network device.

To resolve the foregoing technical problem, an embodiment of the present invention provides a communication method. In the communication method, the terminal device sends a plurality of sequences on a first PUCCH, and the plurality of sequences separately carry one piece of state information of a plurality of pieces of second-type UCI (for example, the SR) when carrying the first-type UCI (for example, the HARQ-ACK). The network device detects and receives the plurality of sequences on the first PUCCH, and determines a value of the first-type UCI and the state information of the plurality of pieces of second-type UCI.

The following further describes this embodiment of the present invention in detail based on common aspects related to the present invention. In the description of this embodiment, a latency between uplink and downlink that may exist is ignored, and it is assumed that a sending moment of the network device is the same as a receiving moment of the terminal device. For processing corresponding to sending of the network device and receiving of the terminal device, descriptions are provided from a perspective of the terminal device in this embodiment. A person skilled in the art may understand that, the terminal device performs receiving from the network device means that the network device performs sending.

In addition, numbers of operations in this embodiment of the present invention do not limit a sequence of specific execution processes. In different optional designs, the execution sequence of the foregoing operations is adaptively adjusted.

Embodiment

An embodiment of the present invention provides a communication method. According to the method, an HARQ-ACK value and state information of a plurality of SRs may be carried on one PUCCH, and a plurality of pieces of uplink control information including the HARQ-ACK value and the state information of the plurality of SRs are reported to a network device when an uplink single-carrier feature is maintained.

Figure 5:
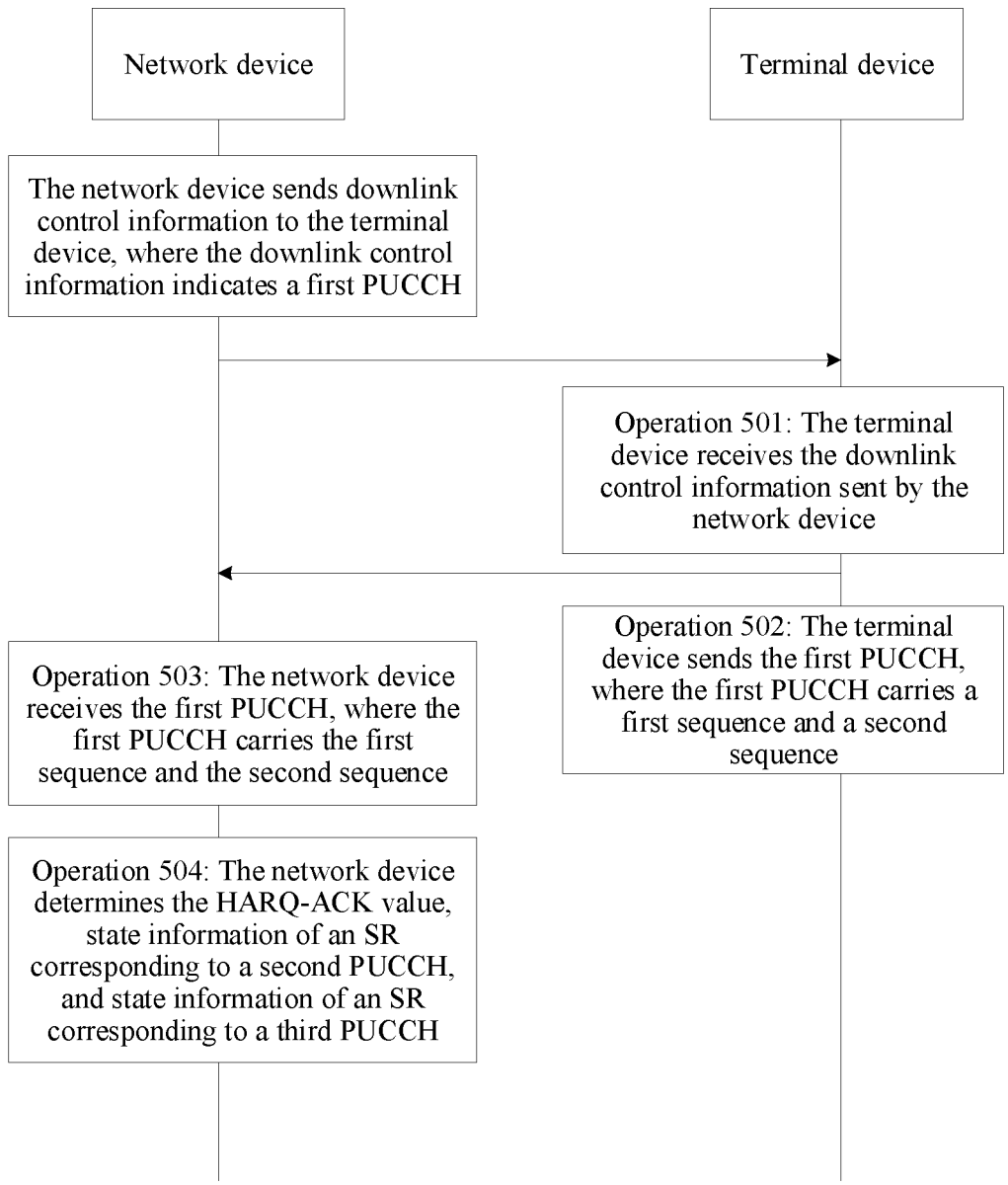
FIG. 5 is a schematic flowchart of a possible communication method according to an embodiment of the present invention.

FIG. 5 shows a specific implementation of the communication method in this embodiment of the present invention. The following describes, according to FIG. 5, a solution provided in this embodiment of the present invention.

Operation 501: A terminal device receives downlink control information (DCI) sent by the network device, where the downlink control information indicates a first PUCCH. Further, the DCI further includes scheduling information of a downlink data channel, and the first PUCCH is used to carry acknowledgment information of the terminal device for the downlink data channel. Further, the acknowledgment information is an HARQ-ACK for the downlink data channel, or is an HARQ-ACK for data transmitted on the downlink data channel. For one embodiment, for the data transmitted on the downlink data channel, the HARQ-ACK may be fed back by using a transport block (TB) as a unit, or the HARQ-ACK may be fed back by using a code block group (CBG) as a unit. Further, for one embodiment, acknowledgment information for one or more units (or referred to as one unit bundling) is fed back by using one bit in the HARQ-ACK.

Before operation 501, the network device sends the downlink control information to the terminal device, where the downlink control information is sent through a physical downlink control channel (PDCCH) or a physical downlink shared channel (PDSCH).

The first PUCCH belongs to a first PUCCH resource set, and PUCCHs in the first PUCCH resource set are configured to transmit UCI of a first bit length range. For one embodiment, the first bit length range is less than or equal to 2 bits, and format information of the PUCCHs in the first PUCCH resource set may be a format 0 or a format 1. The first PUCCH resource set is configured by the network device by using higher layer signaling. Specifically, indication information carried by the downlink control information DCI is used to indicate the first PUCCH in the first PUCCH resource set. For one embodiment, content indicated by the indication information is a resource index of the first PUCCH.

For one embodiment, the first format is the format 0, and the first PUCCH is configured to send uplink control information UCI whose length is less than or equal to 2 bits. Further, for one embodiment, the terminal device sends hybrid automatic repeat request-acknowledgment HARQ-ACK information through the first PUCCH. If acknowledgment information needs to be fed back for one data unit or one data unit bundling, a length of the HARQ-ACK information is 1 bit. If acknowledgment information needs to be fed back for two data units or two data unit bundling, a length of the HARQ-ACK information is 2 bits. The data unit bundling is a set of a plurality of data units, and division or a configuration manner of the bundling is not specifically limited herein. Specifically, for a scenario in which a feedback is performed for one or two data units or data unit bundling, no specific explanation is provided, refer to the prior art. When one bit in the HARQ-ACK feeds back the acknowledgment information for one data unit bundling, for one embodiment, if acknowledgment information for at least one data unit in the data unit bundling is a NACK, the one bit is used to feed back the NACK; and if acknowledgment information for all data units in the data unit bundling is an ACK, the 1 bit is used to feed back the ACK; or if acknowledgment information for at least one data unit in the data unit bundling is an ACK, the 1 bit is used to feed back the ACK; and if acknowledgment information for all data units in the data unit bundling is a NACK, the 1 bit is used to feed back the NACK. The data unit mentioned herein may be a unit or unit for data transmission or scheduling, for example, may be the transport block TB or the code block group CBG.

For one embodiment, a length of a time domain resource of the first PUCCH is two symbols, that is, the first PUCCH occupies only two symbols in time domain: a symbol 0 and a symbol 1. A symbol number may be determined based on a sequence of the symbol in time domain of the first PUCCH. For example, a number of a starting symbol in time domain of the first PUCCH is 0, that is, the starting symbol is the symbol 0, and a number of a second symbol in time domain of the first PUCCH is 1, that is, the second symbol is the symbol 1.

Specifically, the first PUCCH and the second PUCCH occupy a same first time-domain symbol, or the first PUCCH and the second PUCCH include a same first symbol in time domain, that is, the symbol 0. The first PUCCH and a third PUCCH occupy a same second time-domain symbol, or the first PUCCH and the third PUCCH include a same second symbol in time domain, that is, the symbol 1, and both the second PUCCH and the third PUCCH are configured to report scheduling requests SRs. For one embodiment, the second PUCCH and the third PUCCH correspond to different SR configuration, that is, are used to report different SRs. Alternatively, the second PUCCH and the third PUCCH correspond to the same SR configuration, that is, are used to report a same SR. Further, the second PUCCH and the third PUCCH are configured by the network device by using the higher layer signaling. It should be noted herein that the foregoing "occupy" does not mean "occupy only".

For one embodiment, the second PUCCH and/or the third PUCCH occupy only one symbol in time domain. Specifically, the second PUCCH occupies only the first symbol in time domain, and/or the third PUCCH occupies only the second symbol in time domain.

For one embodiment, the second PUCCH and/or the third PUCCH may occupy more than one symbol in time domain, and another symbol included in the second PUCCH in time domain other than the first symbol is not included in the time domain resource of the first PUCCH, and/or another symbol included in the third PUCCH in time domain other than the second symbol is not included in the time domain resource of the first PUCCH.

For one embodiment, transmission of the second PUCCH and the third PUCCH is based on time division multiplexing (Time Division Multiplexing, TDM), and resources of the second PUCCH and the third PUCCH do not overlap in time domain.

The receiving operation may be performed by a transceiver 301 or a receiver 301A of the terminal device.

Operation 502: The terminal device sends the first PUCCH, where the first PUCCH carries a first sequence and a second sequence.

Specifically, the terminal device sends the first sequence on the first time-domain symbol of the first PUCCH, and sends the second sequence on the second time-domain symbol of the first PUCCH. For one embodiment, a time-domain symbol is a symbol. A cyclic shift of the first sequence is determined based on a hybrid automatic repeat request-acknowledgment HARQ-ACK value and state information of the SR corresponding to the second PUCCH, and a cyclic shift of the second sequence is determined based on the HARQ-ACK value and state information of the SR corresponding to the third PUCCH. For ease of description, the SR corresponding to the second PUCCH is referred to as an SR0, and the SR corresponding to the third PUCCH is referred to as an SR1. The HARQ-ACK is acknowledgment information of the downlink data channel mentioned in operation 501. Herein, "an SR corresponding to a PUCCH" refers to "the PUCCH is configured to transmit the SR", or refers to "the PUCCH is configured to carry the SR", or "SR configuration of the SR corresponds to the PUCCH resource". Specifically, the second PUCCH is configured to transmit a first SR (SR0), the third PUCCH is configured to transmit a second SR (SR1). The cyclic shift of the first sequence is determined based on the hybrid automatic repeat request-acknowledgment HARQ-ACK value and the state information of the first SR, and the cyclic shift of the second sequence is determined based on the HARQ-ACK value and the state information of the second SR.

Further, regardless of whether the SR0 is in a positive or negative state, the terminal device does not send the SR0 through the second PUCCH; and regardless of whether the SR1 is in a positive or negative state, the terminal device does not send the SR1 through the third PUCCH. By using the first sequence and the second sequence that are sent on the first PUCCH, the state information of the SR0 and the state information of the SR1 are implicitly indicated to the network device, and the network device may determine whether there is a corresponding scheduling request SR without sending on the second PUCCH and the third PUCCH.

The sending operation may be performed by the transceiver 301 or a transmitter 301B of the terminal device.

Before operation 502, the method further includes operation 5011: The terminal device determines a plurality of sequences sent on the first PUCCH, where the plurality of sequences include the first sequence and the second sequence.

For one embodiment, the first PUCCH occupies only two symbols in time domain, and the plurality of sequences are the first sequence and the second sequence. The terminal device determines the first sequence sent on the first symbol, and determines the second sequence sent on the second symbol. It should be noted herein that a sequence in which the terminal device determines the first sequence and the second sequence is not limited.

Operation 5011 further includes the following operations.

The terminal device determines a first parameter based on the HARQ-ACK value and the state information of the SR corresponding to the second PUCCH, and determines a second parameter based on the HARQ-ACK value and the state information of the SR corresponding to the third PUCCH. The first parameter is used to determine the cyclic shift of the first sequence sent on the first symbol, and the second parameter is used to determine the cyclic shift of the second sequence sent on the second symbol. It should be noted herein that a sequence in which the terminal device determines the first parameter and the second parameter is not specifically limited.

Figure 6:
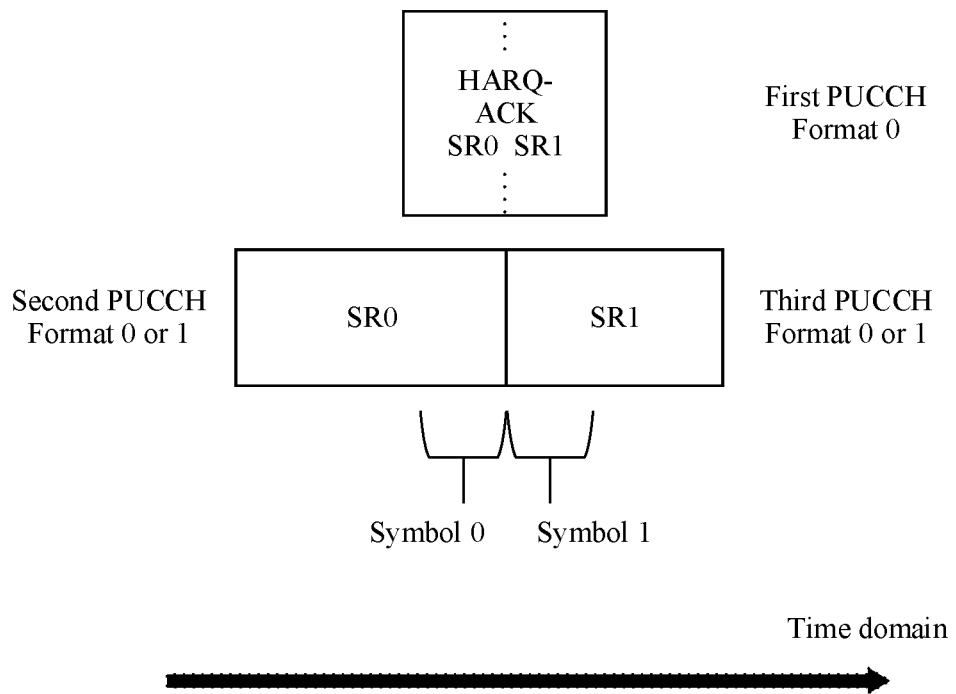
FIG. 6 is a schematic diagram of a solution for resolving a PUCCH time domain resource collision according to an embodiment of the present invention.

For details, refer to FIG. 6. A format of the first PUCCH is the format 0, and the first PUCCH occupies two symbols in time domain. The second PUCCH is configured to send the SR0, and the third PUCCH is configured to send the SR1. A format of the second PUCCH is the format 0 or the format 1, and a format of the third PUCCH is the format 0 or the format 1. A total quantity of symbols occupied by the second PUCCH and the third PUCCH in time domain is not determined herein. In time domain, both the second PUCCH and the first PUCCH occupy the symbol 0, and both the third PUCCH and the first PUCCH occupy the symbol 1. Such configuration causes time domain overlapping or a collision. According to the solution provided in this embodiment of the present invention, the symbol 0 of the first PUCCH in time domain carries both the HARQ-ACK value and the state information of the SR0 corresponding to the second PUCCH that need to be sent on the first PUCCH. The symbol 1 of the first PUCCH in time domain carries both the HARQ-ACK value and the state information of the SR1 corresponding to the third PUCCH that need to be sent on the first PUCCH.

Operation 5011 is performed by a processor 304 of the terminal device.

For one embodiment, the terminal device determines the first parameter based on a pre-defined mapping relationship, the HARQ-ACK value, and the state information of the SR corresponding to the second PUCCH, and determines the second parameter based on the pre-defined mapping relationship, the HARQ-ACK value, and the state information of the SR corresponding to the third PUCCH.

For one embodiment, when the state information of the SR corresponding to the second PUCCH is different from the state information of the SR corresponding to the third PUCCH, a value of the first parameter is different from a value of the second parameter; or when the state information of the SR corresponding to the second PUCCH is the same as the state information of the SR corresponding to the third PUCCH, a value of the first parameter is the same as a value of the second parameter.

For one embodiment, the first parameter is $m_{cs}(i)$, the cyclic shift of the first sequence sent on the first time-domain symbol i is $\alpha_i$, and $\alpha_i$ and $m_{cs}(i)$ meet the following formula:

$$\alpha_i = \frac{2\pi}{N_{sc}^{RB}}((m_0 + m_{cs}(i) + n_{cs}(n_{s,f}^{\mu}, i+i')) \bmod N_{sc}^{RB}),\quad\text{Formula (2),}$$

where i is a symbol number of the first time-domain symbol, $n_{s,f}^{\mu}$ is a slot number in a radio frame in which the symbol i is located, i' is a symbol index of a starting symbol of the first PUCCH in time domain within the slot, and $n_{cs}(n_{s,f}^{\mu},i+i')$ is a pseudo random number determined based on $n_{s,f}^{\mu}$, i, and i'.

The second parameter is $m_{cs}(j)$, the cyclic shift of the second sequence sent on the second time-domain symbol j is $\alpha_j$, and $\alpha_j$ and $m_{cs}(j)$ meet the following formula:

$$\alpha_j = \frac{2\pi}{N_{sc}^{RB}}((m_0 + m_{cs}(j) + n_{cs}(n_{s,f}^{\mu}, j+j')) \bmod N_{sc}^{RB}),\quad\text{Formula (3),}$$

where j is a symbol number of the second time-domain symbol, $n_{s,f}^{\mu}$ is a slot number in a radio frame in which the symbol j is located, j' is a symbol index of the starting symbol of the first PUCCH in time domain within the slot, and $n_{cs}(n_{s,f}^{\mu}, j+j')$ is a pseudo random number determined based on $n_{s,f}^{\mu}$, j, and j'.

$m_0$ is a pre-configured parameter, for example, configured by using the higher layer signaling, and $N_{sc}^{RB}$ is a quantity of subcarriers included in one resource block RB.

For one embodiment, the first PUCCH is located in one slot in time domain, slot numbers in the radio frame in which the first time-domain symbol i and the second time-domain symbol j are located are the same, and the symbol index of the starting symbol of the first PUCCH in time domain within the slot is also unique. Therefore, when cyclic shifts $\alpha_i$ and $\alpha_j$ are determined, values of $n_{s,f}^{\mu}$ are the same, and i'=j'. In the prior art, there are a plurality of pieces of possible subcarrier spacing configuration. However, for the first PUCCH configured in one slot, values of $n_{s,f}^{\mu}$ corresponding to all symbols are the same. For ease of description, $n_{s,f}^{\mu}$ is represented by n in the formula, n has a same meaning as and both represent a slot number (slot number) in a radio frame in which the symbol is located.

Further, the formula (2) may be represented as:

$$\alpha_i = \frac{2\pi}{N_{sc}^{RB}}((m_0 + m_{cs}(i) + n_{cs}(n, i+i')) \bmod N_{sc}^{RB}),\quad\text{Formula (2').}$$

Formula (3) may be represented as:

$$\alpha_j = \frac{2\pi}{N_{sc}^{RB}}((m_0 + m_{cs}(j) + n_{cs}(n, j+j')) \bmod N_{sc}^{RB}),\quad\text{Formula (3').}$$

In another optional design, the first PUCCH is located in more than one slot in time domain. For details, refer to the formula (2) and the formula (3).

In conclusion, it can be learned that the parameter used to determine the cyclic shift of the sequence transmitted on the time-domain symbol of the first PUCCH is related to whether the time-domain symbol on which the sequence is to be sent overlaps a time domain resource of another PUCCH, and is further related to state information of an SR corresponding to the another PUCCH whose time domain resource overlaps with the time-domain symbol on which the sequence is to be sent. For the symbol numbered l in time domain of the first PUCCH, the cyclic shift of the sequence sent on the symbol and the parameter $m_{cs}(l)$ used to determine the cyclic shift meet the following formula:

$$\alpha_l = \frac{2\pi}{N_{sc}^{RB}}((m_0 + m_{cs}(l) + n_{cs}(n_{s,f}^{\mu}, l+l')) \bmod N_{sc}^{RB}),\quad\text{Formula (4),}$$

where l is a symbol number (symbol number) of the symbol in time domain of the first PUCCH, and for another parameter, refer to the foregoing description. If the first PUCCH and another PUCCH overlap on the symbol l in time domain, the value of $m_{cs}(l)$ needs to be determined based on the state information of the SR corresponding to the another PUCCH and a value of an HARQ-ACK to be transmitted on the first PUCCH. For one embodiment, the value is determined based on one of Tables 1 to 4. Alternatively, a mapping relationship between the value of $m_{cs}(l)$, the state information of the SR corresponding to the another PUCCH, and the value of the HARQ-ACK to be transmitted on the first PUCCH is pre-defined. For one embodiment, the mapping relationship is pre-defined by using at least one table. For explanations of the at least one table, refer to the foregoing descriptions.

For one embodiment, the first PUCCH occupies only the symbol 0 and the symbol 1 in time domain, if a time domain collision occurs between the symbol 0 and the second PUCCH (or the second PUCCH configured to transmit the SR0), and a time domain collision occurs between the symbol 1 and the third PUCCH (or the third PUCCH configured to transmit the SR1), the parameter used to determine the cyclic offset $\alpha_0$ of the sequence sent on the symbol 0 of the first PUCCH is $m_{cs}(0)$, and the parameter used to determine the cyclic offset $\alpha_1$ of the sequence sent on the symbol 1 of the first PUCCH is $m_{cs}(1)$. A first mapping relationship exists between the value of $m_{cs}(0)$, the state information of the SR0, and the value of the to-be-transmitted HARQ-ACK, and a second mapping relationship exists between the value of $m_{cs}(1)$, the state information of the SR1, and the value of the to-be-transmitted HARQ-ACK. The first mapping relationship and the second mapping relationship are pre-defined. Further, for one embodiment, the first mapping relationship and the second mapping relationship are pre-defined in at least one table, for example, Tables 1 to 4.

Further, the value of $m_{cs}(0)$ and the value of $\alpha_0$ meet formula (4), and the value of $m_{cs}(1)$ and the value of $\alpha_1$ also meet formula (4).

Operation 503: The network device receives the first PUCCH, where the first PUCCH carries the first sequence and the second sequence.

Specifically, the network device receives the first sequence on the first time-domain symbol of the first PUCCH, and receives the second sequence on the second time-domain symbol of the first PUCCH, where the cyclic shift of the first sequence is used to indicate the hybrid automatic repeat request-acknowledgment HARQ-ACK value and the state information of the SR corresponding to the second PUCCH, and the cyclic shift of the second sequence is used to indicate the HARQ-ACK value and the state information of the SR corresponding to the third PUCCH.

It should be noted herein that, that the network device receives the sequence may be understood as that the network device receives and detects the sequence, or the network device obtains the sequence. The detection and receiving operations are not specifically distinguished in this embodiment of the present invention. In subsequent processing, the network device needs to perform related processing based on the received or obtained sequence, to determine the cyclic shift and the parameter $m_{cs}$.

Operation 503 may be performed by a transceiver 202 and a receiver 202A of the network device, or may be jointly performed by the receiver 202A and the processor 201.

Operation 504: The network device determines the HARQ-ACK value, the state information of the SR corresponding to the second PUCCH, and the state information of the SR corresponding to the third PUCCH. Specifically, the network device determines, based on the first sequence and the second sequence, the HARQ-ACK value, the state information of the SR corresponding to the second PUCCH, and the state information of the SR corresponding to the third PUCCH.

For one embodiment, the network device determines, based on the first parameter and the pre-defined mapping relationship, the HARQ-ACK value and the state information of the SR corresponding to the second PUCCH, and determines, based on the second parameter and the pre-defined mapping relationship, the HARQ-ACK value and the state information of the SR corresponding to the third PUCCH, where the first parameter is obtained based on the cyclic shift of the first sequence, and the second parameter is obtained based on the cyclic shift of the second sequence. For one embodiment, the network device obtains the first parameter by detecting the first sequence, and obtains the second parameter by detecting the second sequence. For a specific detection manner, refer to the explanation in the prior art.

Operation 504 may be performed by a processor 201 of the network device.

According to the foregoing communication method provided in this embodiment of the present invention, when resources of a plurality of PUCCHs overlap or collide in time domain, one PUCCH may carry the HARQ-ACK value and state information of a plurality of SRs, and a plurality of pieces of uplink control information are reported to the network device through a single PUCCH when an uplink single-carrier feature is maintained, thereby improving communication efficiency and efficiency.

The foregoing mainly describes the solution provided in this embodiment of the present invention from a perspective of interaction between network elements. It may be understood that, to implement the foregoing functions, the network elements such as the network device and the terminal device include corresponding hardware structures and/or software modules for executing the functions. A person of ordinary skill in the art should easily be aware that, in combination with the examples described in the embodiments disclosed in this specification, units, algorithms operations may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

The following provides further explanations based on a possible structure of the terminal device in FIG. 3. The terminal device can perform any method in the embodiments of the present invention. The terminal device may include at least a transceiver 301 and a processor 304 (which is referred to as a processor herein, and may represent a modem processor 304 or integration of the modem 304 and an application processor 302). For one embodiment, the terminal device may further include another component, such as a memory, in FIG. 3 and in descriptions of FIG. 3. The transceiver 301 herein may include an independent receiver and an independent transmitter, and separately execute corresponding receiving and sending functions, or may be a transceiver integrated with receiving and sending functions. This is not further limited herein. Structurally, the transceiver 301 in FIG. 3 may be split into a receiver 301A and a transmitter 301B. Herein, because the terminal device is merely used as an example for description of an optional body, the following uses a wireless apparatus as a body for description. The wireless apparatus may be a unit, a chip, or a component included in the terminal device, or the terminal device.

For this embodiment of the present invention: The wireless apparatus includes a processor 304, a receiver 301A, and a transmitter 301B.

The receiver 301A is configured to receive downlink control information DCI sent by a network device, where the downlink control information indicates a first physical uplink control channel PUCCH, the first PUCCH and a second PUCCH occupy a same first time-domain symbol, the first PUCCH and a third PUCCH occupy a same second time-domain symbol, and both the second PUCCH and the third PUCCH are configured to report scheduling requests SRs.

The transmitter 301B sends the first PUCCH, where the first PUCCH carries a first sequence and a second sequence.

The DCI further includes scheduling information of a downlink data channel, and the first PUCCH is used to carry acknowledgment information of the terminal device for the downlink data channel. Further, the acknowledgment information is an HARQ-ACK for the downlink data channel, or is an HARQ-ACK for data transmitted on the downlink data channel.

Specifically, the transmitter 301B is configured to: send the first sequence on the first time-domain symbol of the first PUCCH, and send the second sequence on the second time-domain symbol of the first PUCCH, where a cyclic shift of the first sequence is determined based on a hybrid automatic repeat request-acknowledgment HARQ-ACK value and state information of the SR corresponding to the second PUCCH, and a cyclic shift of the second sequence is determined based on the HARQ-ACK value and state information of the SR corresponding to the third PUCCH.

For one embodiment, the processor 304 is configured to determine a plurality of sequences sent on the first PUCCH, where the plurality of sequences include the first sequence and the second sequence. For one embodiment, the first PUCCH occupies only two symbols in time domain, and the plurality of sequences are the first sequence and the second sequence. The processor 304 is configured to: determine the first sequence sent on the first symbol, and determine the second sequence sent on the second symbol.

For one embodiment, a length of a time domain resource of the first PUCCH is two time-domain symbols.

For one embodiment, the first PUCCH is used to send uplink control information UCI whose length is less than or equal to two bits.

For one embodiment, the processor 304 is configured to: determine a first parameter based on the HARQ-ACK value and the state information of the SR corresponding to the second PUCCH, and determine a second parameter based on the HARQ-ACK value and the state information of the SR corresponding to the third PUCCH, where the first parameter is used to determine the cyclic shift of the first sequence, and the second parameter is used to determine the cyclic shift of the second sequence.

Further, for one embodiment, the processor 304 is configured to: determine the first parameter based on a pre-defined mapping relationship, the HARQ-ACK value, and the state information of the SR corresponding to the second PUCCH, and determine the second parameter based on the pre-defined mapping relationship, the HARQ-ACK value, and the state information of the SR corresponding to the third PUCCH.

Specifically, when the state information of the SR corresponding to the second PUCCH is different from the state information of the SR corresponding to the third PUCCH, a value of the first parameter is different from a value of the second parameter; or when the state information of the SR corresponding to the second PUCCH is the same as the state information of the SR corresponding to the third PUCCH, a value of the first parameter is the same as a value of the second parameter.

Further, for one embodiment, the first parameter is $m_{cs}(i)$, the second parameter is $m_{cs}(j)$, where i is a symbol number of the first symbol in time domain of the first PUCCH, and j is a symbol number of the second symbol in time domain of the first PUCCH. For explanations of the first parameter and the second parameter, refer to the method embodiments.

It should be noted that, for a specific implementation of the communication method performed by the wireless apparatus, refer to descriptions of the embodiments of the present invention and the communication method provided in the embodiments of the present invention. The terminal device in the embodiments of the present invention and the communication method corresponding to FIG. 5 are based on a same concept, and technical effects brought by the terminal device are the same as those brought by the foregoing communication method. Specific functions of the processor, the receiver, and the transmitter that are included in the wireless apparatus in the embodiments of the present invention, and any feature, term, and implementation details related thereto correspond to functions of the terminal device in the method embodiment corresponding to FIG. 5. For specific content, refer to the description in the method embodiment corresponding to FIG. 5 of the present invention. Details are not described herein again.

It should be noted that, in the foregoing embodiments, the wireless apparatus may be completely or partially implemented by using software, hardware, firmware, or any combination thereof.

Figure 7:
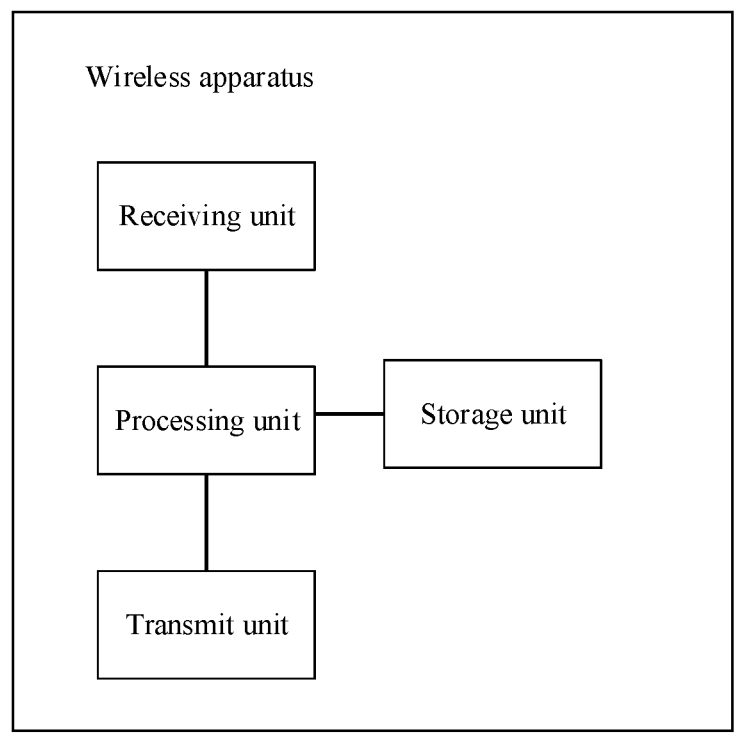
FIG. 7 is a possible schematic structural diagram of a wireless apparatus according to an embodiment of the present invention.

For a structure of the wireless apparatus, in another optional manner, a corresponding component in the foregoing embodiments may be implemented by corresponding hardware, or may be implemented by corresponding hardware by executing corresponding software. For example, the receiver 301A may be hardware that has the receiving function, for example, a transceiver integrated with a transceiver function or a receiver that implements only a receiving function, or may be a general processor or another hardware device that can execute a corresponding computer program to implement the foregoing functions, or may be a software module or a function unit that executes a corresponding function, for example, a receiving unit. For another example, the processor 304 may be hardware that executes a function of the processor, for example, a processor with a specific function, or a general processor, or may be another hardware device that can execute a corresponding computer program to complete the foregoing functions, or may be a software module or a function unit that executes a corresponding function, for example, a processing unit. For still another example, the transmitter 301B may be hardware that has the sending function, for example, a transceiver integrated with a transceiver function, or a transmitter that implements only a transceiver function, or may be a general processor or another hardware device that can execute a corresponding computer program to implement the foregoing functions, or may be a software module or a function unit that executes a corresponding function, for example, a transmit unit. For one embodiment, the wireless apparatus further includes a storage unit. For details, refer to FIG. 7.

The following provides further explanations based on a possible structure of the network device in FIG. 2. The network device can perform any method in the embodiments of the present invention. The network device may include at least a controller/processor 201 (the following uses the processor 201 as an example for description) and a transceiver 202. For one embodiment, the network device may further include another component, such as a memory, in FIG. 2 and in descriptions of FIG. 2. The transceiver 202 herein may include an independent receiver and an independent transmitter, and separately execute corresponding receiving and sending functions, or may be a transceiver integrated with receiving and sending functions. This is not further limited herein. Structurally, the transceiver 202 in FIG. 2 may be split into a receiver 202A and a transmitter 202B. Herein, because the network device is merely used as an example for description of an optional body, the following uses a wireless apparatus as a body for description. The wireless apparatus may be a unit, a chip, or a component included in the network device, or the network device.

For this embodiment of the present invention, the wireless apparatus includes a processor 201, a transmitter 202B, and a receiver 202A.

The transmitter 202B is configured to send downlink control information DCI to a terminal device, where the downlink control information indicates a first physical uplink control channel PUCCH, the first PUCCH and a second PUCCH occupy a same first time-domain symbol, the first PUCCH and a third PUCCH occupy a same second time-domain symbol, and both the second PUCCH and the third PUCCH are configured to report scheduling requests SRs.

The receiver 202A is configured to receive the first PUCCH, where the first PUCCH carries a first sequence and a second sequence. The DCI further includes scheduling information of a downlink data channel, and the first PUCCH is used to carry acknowledgment information of the terminal device for the downlink data channel. Further, the acknowledgment information is an HARQ-ACK for the downlink data channel, or is an HARQ-ACK for data transmitted on the downlink data channel.

For one embodiment, the receiver 202A is configured to: receive the first sequence on the first time-domain symbol of the first PUCCH, and receive the second sequence on the second time-domain symbol of the first PUCCH, where a cyclic shift of the first sequence is used to indicate a hybrid automatic repeat request-acknowledgment HARQ-ACK value and state information of the SR corresponding to the second PUCCH, and a cyclic shift of the second sequence is used to indicate the HARQ-ACK value and state information of the SR corresponding to the third PUCCH.

For one embodiment, the processor 201 is configured to determine the HARQ-ACK value, the state information of the SR corresponding to the second PUCCH, and the state information of the SR corresponding to the third PUCCH. Specifically, the network device determines, based on the first sequence and the second sequence, the HARQ-ACK value, the state information of the SR corresponding to the second PUCCH, and the state information of the SR corresponding to the third PUCCH.

For one embodiment, a length of a time domain resource of the first PUCCH is two time-domain symbols.

For one embodiment, the first PUCCH is configured to carry uplink control information UCI whose length is less than or equal to two bits.

For one embodiment, the processor 201 determines, based on the first sequence and the second sequence, the HARQ-ACK value, the state information of the SR corresponding to the second PUCCH, and the state information of the SR corresponding to the third PUCCH.

Further, for one embodiment, the processor 201 determines, based on a first parameter and a pre-defined mapping relationship, the HARQ-ACK value and the state information of the SR corresponding to the second PUCCH, and determines, based on a second parameter and the pre-defined mapping relationship, the HARQ-ACK value and the state information of the SR corresponding to the third PUCCH, where the first parameter is obtained based on the cyclic shift of the first sequence, and the second parameter is obtained based on the cyclic shift of the second sequence.

Specifically, when the state information of the SR corresponding to the second PUCCH is different from the state information of the SR corresponding to the third PUCCH, a value of the first parameter is different from a value of the second parameter; or when the state information of the SR corresponding to the second PUCCH is the same as the state information of the SR corresponding to the third PUCCH, a value of the first parameter is the same as a value of the second parameter.

Further, for one embodiment, the first parameter is $m_{cs}(i)$, the second parameter is $m_{cs}(j)$, where i is a symbol number of the first symbol in time domain of the first PUCCH, and j is a symbol number of the second symbol in time domain of the first PUCCH. For explanations of the first parameter and the second parameter, refer to the method embodiments.

It should be noted that, for a specific implementation of the communication method performed by the wireless apparatus, refer to descriptions of the communication method provided in the embodiments of the present invention. The network device in the embodiments of the present invention and the communication method corresponding to FIG. 5 are based on a same concept, and technical effects brought by the terminal device are the same as those brought by the foregoing control resource obtaining method. Specific functions of the processor, the transmitter, and the receiver that are included in the wireless apparatus in the embodiments of the present invention, and any feature, term, and implementation details related thereto correspond to functions of the network device in the method embodiment corresponding to FIG. 5. For specific content, refer to the description in the method embodiment corresponding to FIG. 5 of the present invention. Details are not described herein again.

It should be noted that, in the foregoing embodiments, the wireless apparatus may be completely or partially implemented by using software, hardware, firmware, or any combination thereof.

For a structure of the wireless apparatus, in another optional manner, a corresponding component in the foregoing embodiments may be implemented by corresponding hardware, or may be implemented by corresponding hardware by executing corresponding software. For example, the transmitter 202B may be hardware that has the sending function, for example, a transceiver integrated with a transceiver function or a transmitter that implements only a receiving function, or may be a general processor or another hardware device that can execute a corresponding computer program to implement the foregoing functions, or may be a software module or a function unit that executes a corresponding function, for example, a transmit unit. For another example, the processor 201 may be hardware that executes a function of the processor, for example, a processor with a specific function, or a general processor, or may be another hardware device that can execute a corresponding computer program to complete the foregoing functions, or may be a software module or a function unit that executes a corresponding function, for example, a processing unit. For still another example, the receiver 202A may be hardware that has the receiving function, for example, a transceiver integrated with a transceiver function, or a receiver that implements only a receiving function, or may be a general processor or another hardware device that can execute a corresponding computer program to implement the foregoing functions, or may be a software module or a function unit that executes a corresponding function, for example, a receiving unit. For one embodiment, the wireless apparatus further includes a storage unit. For details, refer to FIG. 7.

It may be understood that, the accompanying drawings show only a simplified design of the wireless apparatus. In actual application, the wireless apparatus may include any quantity of transmitters, receivers, processors, controllers, memories, communications units, and the like.

An embodiment of the present invention further provides a communications system, including at least one network device and at least one terminal device that are mentioned in the foregoing embodiments of the present invention.

An embodiment of the present invention further provides an apparatus (for example, an integrated circuit, a wireless device, and a circuit module), configured to implement the foregoing communication method. An apparatus for implementing a power tracker and/or a power generator described in this specification may be an independent device or may be a part of a larger device. The device may be: (i) an independent IC, (ii) a set of one or more ICs, where the set may include a memory IC for storing data and/or instruction, (iii) an RFIC, such as an RF receiver or an RF transmitter/receiver, (iv) an ASIC, such as a mobile station modem, (v) a module that can be embedded in another device, (vi) a receiver, a cellular phone, a wireless device, or a mobile unit, or (vii) others.

The method and the apparatus provided in the embodiments of the present invention may be applied to the terminal device or the network device (may be collectively referred to as a wireless device). The terminal device or the network device or the wireless device may include a hardware layer, an operating system layer running on the hardware layer, and an application layer running on the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, in the embodiments of the present invention, a specific structure of an execution body of the method is not limited in the embodiments of the present invention, provided that a program that records code of the method in the embodiments of the present invention can be run to perform communication according to the signal transmission method in the embodiments of the present invention. For example, the execution body of the wireless communication method in the embodiments of the present invention may be a terminal device or a network device, or may be executed by a function module that is in the terminal device or the network device and that can invoke and execute a program.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

When the functions are implemented in the form of a software function unit and sold or used as an independent product, the functions may be stored in a computer-readable storage medium. Based on such an understanding, the technical solutions of the embodiments of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, wherein the method comprises:
   receiving, by a terminal device, downlink control information DCI sent by a network device, wherein the downlink control information indicates a first physical uplink control channel (PUCCH), the first PUCCH and a second PUCCH occupy a same first time-domain symbol, the first PUCCH and a third PUCCH occupy a same second time-domain symbol, and both the second PUCCH and the third PUCCH are configured to report scheduling requests (SRs); and
   sending, by the terminal device, a first sequence on the first time-domain symbol of the first PUCCH, and sending a second sequence on the second time-domain symbol of the first PUCCH, wherein a cyclic shift of the first sequence is determined based on a hybrid automatic repeat request-acknowledgment (HARQ-ACK) value and state information of the SR corresponding to the second PUCCH, and a cyclic shift of the second sequence is determined based on the HARQ-ACK value and state information of the SR corresponding to the third PUCCH.

2. The method according to claim 1, wherein a length of a time domain resource of the first PUCCH is two time-domain symbols.

3. The method according to claim 1, wherein the first PUCCH is used to send uplink control information (UCI) whose length is less than or equal to two bits.

4. The method according to claim 1, wherein the method further comprises:
   determining, by the terminal device, a first parameter based on the HARQ-ACK value and the state information of the SR corresponding to the second PUCCH, and determining a second parameter based on the HARQ-ACK value and the state information of the SR corresponding to the third PUCCH, wherein the first parameter is used to determine the cyclic shift of the first sequence, and the second parameter is used to determine the cyclic shift of the second sequence.

5. The method according to claim 4, wherein the determining, by the terminal device, a first parameter based on the HARQ-ACK value and the state information of the SR corresponding to the second PUCCH, and determining a second parameter based on the HARQ-ACK value and the state information of the SR corresponding to the third PUCCH comprises:
   determining, by the terminal device, the first parameter based on a pre-defined mapping relationship, the HARQ-ACK value, and the state information of the SR corresponding to the second PUCCH, and determining the second parameter based on the pre-defined mapping relationship, the HARQ-ACK value, and the state information of the SR corresponding to the third PUCCH.

6. The method according to claim 4, wherein
when the state information of the SR corresponding to the second PUCCH is different from the state information of the SR corresponding to the third PUCCH, a value of the first parameter is different from a value of the second parameter; or
when the state information of the SR corresponding to the second PUCCH is the same as the state information of the SR corresponding to the third PUCCH, a value of the first parameter is the same as a value of the second parameter.

7. The method according to claim 4, wherein
the first parameter is $m_{cs}(i)$, the cyclic shift of the first sequence is $\alpha_i$, and $\alpha_i$ and $m_{cs}(i)$ satisfy the following formula:

$$\alpha_i = \frac{2\pi}{N_{sc}^{RB}}((m_0 + m_{cs}(i) + n_{cs}(n, i + i')) \bmod N_{sc}^{RB}),$$

wherein i is a symbol number of the first time-domain symbol, i' is a symbol index of a starting symbol of the first PUCCH in time domain within a slot, and $n_{cs}(n,i+i')$ is a pseudo random number determined based on n, i, and i'; and
the second parameter is $m_{cs}(j)$, the cyclic shift of the first sequence is $\alpha_j$, and $\alpha_j$ and $m_{cs}(j)$ satisfy the following formula:

$$\alpha_j = \frac{2\pi}{N_{sc}^{RB}}((m_0 + m_{cs}(j) + n_{cs}(n, j + j')) \bmod N_{sc}^{RB}),$$

wherein j is a symbol number of the second time-domain symbol, j' is a symbol index of the starting symbol of the first PUCCH in time domain within the slot, and $n_{cs}(n,j+j')$ is a pseudo random number determined based on $n$, j, and j', wherein
$n$ is a slot number in a radio frame in which the first time-domain symbol i and the second time-domain symbol j are located, $m_0$ is a parameter configured by using higher layer signaling, and $N_{sc}^{RB}$ is a quantity of subcarriers comprised in one resource block RB.

8. The method according to claim 1, wherein
the state information of the SR is a positive state or a negative state.

9. An apparatus, wherein the apparatus comprises:
a receiver, configured to receive downlink control information (DCI) sent by a network device, wherein the downlink control information indicates a first physical uplink control channel (PUCCH), the first PUCCH and a second PUCCH occupy a same first time-domain symbol, the first PUCCH and a third PUCCH occupy a same second time-domain symbol, and both the second PUCCH and the third PUCCH are configured to report scheduling requests (SRs); and
a transmitter, configured to: send a first sequence on the first time-domain symbol of the first PUCCH, and send a second sequence on the second time-domain symbol of the first PUCCH, wherein a cyclic shift of the first sequence is determined based on a hybrid automatic repeat request-acknowledgment (HARQ-ACK) value and state information of the SR corresponding to the second PUCCH, and a cyclic shift of the second sequence is determined based on the HARQ-ACK value and state information of the SR corresponding to the third PUCCH.

10. The apparatus according to claim 9, wherein
a length of a time domain resource of the first PUCCH is two time-domain symbols.

11. The apparatus according to claim 9, wherein
the first PUCCH is used to send uplink control information UCI whose length is less than or equal to two bits.

12. The apparatus according to claim 9, wherein the apparatus further comprises:
a processor, configured to: determine a first parameter based on the HARQ-ACK value and the state information of the SR corresponding to the second PUCCH, and determine a second parameter based on the HARQ-ACK value and the state information of the SR corresponding to the third PUCCH, wherein the first parameter is used to determine the cyclic shift of the first sequence, and the second parameter is used to determine the cyclic shift of the second sequence.

13. The apparatus according to claim 12, wherein
the processor is configured to: determine the first parameter based on a pre-defined mapping relationship, the HARQ-ACK value, and the state information of the SR corresponding to the second PUCCH, and determine the second parameter based on the pre-defined mapping relationship, the HARQ-ACK value, and the state information of the SR corresponding to the third PUCCH.

14. The apparatus according to claim 12, wherein
when the state information of the SR corresponding to the second PUCCH is different from the state information of the SR corresponding to the third PUCCH, a value of the first parameter is different from a value of the second parameter; or
when the state information of the SR corresponding to the second PUCCH is the same as the state information of the SR corresponding to the third PUCCH, a value of the first parameter is the same as a value of the second parameter.

15. The apparatus according to claim 12, wherein
the first parameter is $m_{cs}(i)$, the cyclic shift of the first sequence is $\alpha_i$, and $\alpha_i$ and $m_{cs}(i)$ meet the following formula:

$$\alpha_i = \frac{2\pi}{N_{sc}^{RB}}((m_0 + m_{cs}(i) + n_{cs}(n, i + i')) \bmod N_{sc}^{RB}),$$

wherein i is a symbol number of the first time-domain symbol, i' is a symbol index of a starting symbol of the first PUCCH in time domain within a slot, and $n_{cs}(n,i+i')$ is a pseudo random number determined based on $n$, i, and i'; and
the second parameter is $m_{cs}(j)$, the cyclic shift of the first sequence is $\alpha_j$, and $\alpha_j$ and $m_{cs}(j)$ meet the following formula:

$$\alpha_j = \frac{2\pi}{N_{sc}^{RB}}((m_0 + m_{cs}(j) + n_{cs}(n, j + j')) \bmod N_{sc}^{RB}),$$

wherein j is a symbol number of the second time-domain symbol, j' is a symbol index of the starting symbol of the first PUCCH in time domain within the slot, and $n_{cs}(n, j+j')$ is a pseudo random number determined based on $n$, j, and j', wherein
$n$ is a slot number in a radio frame in which the first time-domain symbol i and the second time-domain symbol j are located, $m_0$ is a parameter configured by using higher layer signaling, and $N_{sc}^{RB}$ is a quantity of subcarriers comprised in one resource block RB.

16. The apparatus according to claim 9, wherein the state information of the SR is a positive state or a negative state.

17. A non-transitory storage medium, wherein the non-transitory storage medium stores a computer program, which when executed by one or more processors, cause the one or more processors to perform operations, the operations comprising:
   receiving, by a terminal device, downlink control information DCI sent by a network device, wherein the downlink control information indicates a first physical uplink control channel (PUCCH), the first PUCCH and a second PUCCH occupy a same first time-domain symbol, the first PUCCH and a third PUCCH occupy a same second time-domain symbol, and both the second PUCCH and the third PUCCH are configured to report scheduling requests (SRs); and
   sending, by the terminal device, a first sequence on the first time-domain symbol of the first PUCCH, and sending a second sequence on the second time-domain symbol of the first PUCCH, wherein a cyclic shift of the first sequence is determined based on a hybrid automatic repeat request-acknowledgment (HARQ-ACK) value and state information of the SR corresponding to the second PUCCH, and a cyclic shift of the second sequence is determined based on the HARQ-ACK value and state information of the SR corresponding to the third PUCCH.

18. The non-transitory storage medium according to claim 17, wherein
   a length of a time domain resource of the first PUCCH is two time-domain symbols.

19. The non-transitory storage medium according to claim 17, wherein
   the first PUCCH is used to send uplink control information (UCI) whose length is less than or equal to two bits.

20. The non-transitory storage medium according to claim 17, wherein the method further comprises:
   determining, by the terminal device, a first parameter based on the HARQ-ACK value and the state information of the SR corresponding to the second PUCCH, and determining a second parameter based on the HARQ-ACK value and the state information of the SR corresponding to the third PUCCH, wherein the first parameter is used to determine the cyclic shift of the first sequence, and the second parameter is used to determine the cyclic shift of the second sequence.

* * * * *